US012280346B2

(12) United States Patent
Nitta et al.

(10) Patent No.: US 12,280,346 B2
(45) Date of Patent: Apr. 22, 2025

(54) MICROMIXER

(71) Applicants: CKD CORPORATION, Aichi (JP); Shimadzu Corporation, Kyoto (JP); Shinwa Chemical Industries Ltd., Kyoto (JP)

(72) Inventors: Shinichi Nitta, Aichi (JP); Hiroshi Itafuji, Aichi (JP); Mitsuyoshi Ohsaki, Aichi (JP); Masahide Gunji, Kyoto (JP); Hiroshi Kobayashi, Kyoto (JP); Katsuya Okumura, Tokyo (JP)

(73) Assignees: CKD CORPORATION, Aichi (JP); Shimadzu Corporation, Kyoto (JP); Shinwa Chemical Industries Ltd., Kyoto (JP)

( * ) Notice: Subject to any disclaimer, the term of this patent is extended or adjusted under 35 U.S.C. 154(b) by 698 days.

(21) Appl. No.: 17/684,062

(22) Filed: Mar. 1, 2022

(65) Prior Publication Data

US 2022/0314177 A1 Oct. 6, 2022

(30) Foreign Application Priority Data

Apr. 5, 2021 (JP) ................................ 2021-064483

(51) Int. Cl.
*B01F 33/301* (2022.01)
*B01F 25/422* (2022.01)
(Continued)

(52) U.S. Cl.
CPC .......... *B01F 33/301* (2022.01); *B01F 25/422* (2022.01); *B01F 33/3039* (2022.01);
(Continued)

(58) Field of Classification Search
CPC .. B01F 33/301; B01F 25/422; B01F 33/3039; B01F 35/165; B01F 35/423;
(Continued)

(56) References Cited

U.S. PATENT DOCUMENTS 3,382,534 A * 5/1968 Veazey .................... D01D 5/30 264/172.16
5,486,335 A * 1/1996 Wilding .............. B01F 35/7182 422/68.1
(Continued)

FOREIGN PATENT DOCUMENTS

DE 20304101 U1 * 5/2003 .......... B01F 13/0059
EP 0495169 A1 * 7/1992
(Continued)

OTHER PUBLICATIONS

Notice of First Examination Opinion issued in corresponding Chinese Patent Application No. 202210206477.X, dated Aug. 29, 2023, 20 pages.

(Continued)

*Primary Examiner* — Charles Cooley
(74) *Attorney, Agent, or Firm* — Osha Bergman Watanabe & Burton LLP

(57) ABSTRACT

A micromixer includes: a first channel plate where a first channel and a plurality of first branch channels are each formed by a non-through groove in a front surface, and a first confluence channel is formed by a non-through groove in a rear surface, and includes a first communication channel that communicates the first branch channels with the first confluence channel; a first lid plate that covers the front surface; a second channel plate where a second confluence channel is formed by a non-through groove in the front surface, and a second channel and a plurality of second branch each formed by a non-through groove in the rear surface, and includes a second communication channel that communicates the second branch channels with the second confluence channel; and a second lid plate that covers the rear surface of the second channel plate.

18 Claims, 20 Drawing Sheets

(51) Int. Cl.
*B01F 33/3039* (2022.01)
*B01F 35/00* (2022.01)
*B01F 35/42* (2022.01)

(52) U.S. Cl.
CPC .......... *B01F 35/165* (2022.01); *B01F 35/423* (2022.01); *B01F 35/561* (2022.01)

(58) Field of Classification Search
CPC ................ B01F 35/561; B01F 25/4319; B01F 25/431971; B01F 33/3012
USPC ................................ 366/336, DIG. 1–DIG. 4
See application file for complete search history.

(56) References Cited

U.S. PATENT DOCUMENTS

| | | | | |
|---|---|---|---|---|
| 6,877,892 | B2 * | 4/2005 | Karp | B01F 25/433 422/504 |
| 6,935,768 | B2 * | 8/2005 | Lowe | B01F 25/25 366/DIG. 3 |
| 2002/0097633 | A1 * | 7/2002 | O'Connor | B01D 17/0208 366/341 |
| 2003/0133358 | A1 * | 7/2003 | Karp | B01F 25/314 366/341 |
| 2004/0027915 | A1 * | 2/2004 | Lowe | B01F 25/4338 366/341 |
| 2022/0314177 | A1 * | 10/2022 | Nitta | B01F 33/301 |
| 2022/0316629 | A1 * | 10/2022 | Nitta | B23K 20/02 |

FOREIGN PATENT DOCUMENTS

| | | | | |
|---|---|---|---|---|
| EP | 0870541 | A2 * | 10/1998 | |
| JP | 2006-102681 | A | 4/2006 | |
| JP | 4403943 | B2 | 1/2010 | |
| WO | WO-0211888 | A2 * | 2/2002 | B01D 17/00 |

OTHER PUBLICATIONS

Office Action issued in Chinese Application No. 202210206477.X; Dated Mar. 30, 2024 (7 pages).

* cited by examiner

MICROMIXER

CROSS-REFERENCE TO RELATED APPLICATION

The present application claims priority from Japanese Patent Application No. 2021-064483 filed on Apr. 5, 2021, the contents of which are incorporated herein by reference.

BACKGROUND

Technical Field

The present disclosure relates to a micromixer having channels formed in each plate.

Description of Related Art

There is a micromixer of related art including two introduction plates in each of which a fluid introduction channel is formed by a through groove passing through the plate, a mixing plate which is disposed between the two introduction plates and in which a mixing channel that mixes fluids received from the introduction channels with each other is formed by a through groove, and two lid plates that cover the introduction channels of the two introduction plates (see Japanese Patent No. 4,403,943).

To facilitate the mixing of the fluids, each of the introduction channels may be divided into thin branch introduction channels. In the introduction plates of the micromixer described in Japanese Patent No. 4,403,943, however, the periphery of the portion between the introduction channels is cut by the introduction channels (through grooves), so that thin introduction channels and a thin portion between the introduction channels make it difficult to ensure the strength of the portion between the introduction channels. In addition, to simplify the configuration of the micromixer, the channels should be formed with a smaller number of plates.

SUMMARY

One or more embodiments of the present disclosure provide a micromixer including plates each having thin channels and thin portions between the channels and still capable of securing the strength of the portions between the channels and forming channels with a smaller number of plates.

First means is a micromixer including

- a first channel plate having a front surface in which a first channel and a plurality of first branch channels into which the first channel is divided are each formed by a non-through groove and a rear surface in which a first confluence channel is formed by a non-through groove and including a first communication channel that causes the plurality of first branch channels to communicate with the first confluence channel,
- a first lid plate that covers the front surface of the first channel plate,
- a second channel plate having a front surface in which a second confluence channel is formed by a non-through groove and a rear surface in which a second channel and a plurality of second branch channels into which the second channel is divided are each formed by a non-through groove and including a second communication channel that causes the plurality of second branch channels to communicate with the second confluence channel, the first confluence channel and the second confluence channel being disposed so as to face each other and communicate with each other, and
- a second lid plate that covers the rear surface of the second channel plate.

According to the configuration described above, the first channel and the plurality of first branch channels into which the first channel is divided are each formed by a non-through groove (groove that does not pass through plate) in the front surface of the first channel plate. The first lid plate covers the front surface of the first channel plate, that is, the first channel and the first branch channels, and comparts the first channel and the first branch channels.

Since the plurality of first branch channels are each formed by a non-through groove, the periphery of the portion between the first branch channels is not cut by the first branch channels. Therefore, even when the first branch channels and the portions between the first branch channels are made thinner, the strength of the portions between the first branch channels can be ensured.

The first confluence channel is formed by a non-through groove in the rear surface of the first channel plate. The first communication channel, which causes the plurality of first branch channels to communicate with the first confluence channel, is formed in the first channel plate. A first fluid is therefore allowed to flow through the first channel, which branches off into the plurality of first branch channels, which then merge into the first confluence channel via the first communication channel.

Similarly, even when the second branch channels are each made thinner, the strength of the portions between the second branch channels can be ensured. A second fluid is allowed to flow through the second channel, which branches off into the plurality of second branch channels, which then merge into the second confluence channel via the second communication channel. The second channel plate is so disposed that the first confluence channel and the second confluence channel face each other and communicate with each other. Therefore, the first fluid flowing through the plurality of first branch channels, which merge into the first confluence channel, and the second fluid flowing through the plurality of second branch channels, which merge into the second confluence channel, can be mixed with each other in the first confluence channel and the second confluence channel, which communicate with each other, whereby the first fluid and the second fluid can be mixed with each other in a facilitated manner.

Furthermore, the first confluence channel is formed in the rear surface of the first channel plate, and the second confluence channel is formed in the front surface of the second channel plate. It is therefore not necessary to prepare a plate for forming a confluence channel (mixing plate in Japanese Pat. No. 4,403,943, for example) separately from the first channel plate and the second channel plate. The channels of the micromixer can therefore be formed with a smaller number of plates.

In second means, the plurality of first branch channels include a plurality of first-stage channels into which the first channel is divided and a plurality of second-stage channels into which each of the first-stage channels is divided. The first communication channel causes the plurality of second-stage channels in the plurality of first branch channels to communicate with the first confluence channel. The plurality of second branch channels include a plurality of first-stage channels into which the second channel is divided and a plurality of second-stage channels into which each of the first-stage channels is divided. The second communication channel causes the plurality of second-stage channels in the plurality of second branch channels to communicate with the second confluence channel.

According to the configuration describe above, the plurality of first branch channels in the first channel plate include the plurality of first-stage channels into which the first channel is divided and the plurality of second-stage channels into which each of the first-stage channels is divided. The flow rate distribution of the first fluid in the first channel can therefore be made smaller than the flow rate distribution of the first fluid in the first channel having a configuration in which the first channel extends for a long distance. Differences in the flow rate of the first fluid flowing through the plurality of second-stage channels can therefore be suppressed. Similarly, in the second channel plate, differences in the flow rate of the second fluid flowing through the plurality of second-stage channels can be suppressed.

The first communication channel causes the plurality of second-stage channels in the plurality of first branch channels to communicate with the first confluence channel. The second communication channel causes the plurality of second-stage channels in the plurality of second branch channels to communicate with the second confluence channel. The first fluid flowing through the plurality of second-stage channels, which merge into the first confluence channel, in the first channel plate and the second fluid flowing through the plurality of second-stage channels, which merge into the second confluence channel, in the second channel plate can therefore be mixed with each other more uniformly, whereby the first fluid and the second fluid can be mixed with each other in a further facilitated manner.

In third means, the first confluence channel includes a plurality of first confluence remainders that are portions where none of the non-through grooves are formed. The second confluence channel includes a plurality of second confluence remainders that are portions where none of the non-through grooves are formed. The plurality of first confluence remainders and the plurality of second confluence remainders are bonded to each other.

According to the configuration describe above, the first confluence channel includes the plurality of first confluence remainders, which are portions where no non-through groove is formed. The plurality of first confluence remainders can therefore change the flow direction of the fluid flowing through the first confluence channel, and hence mix the first fluid and the second fluid with each other in a further facilitated manner. Similarly, the plurality of second confluence remainders can change the flow direction of the fluid flowing through the second confluence channel, and hence mix the first fluid and the second fluid with each other in a further facilitated manner.

Furthermore, since the plurality of first confluence remainders and the plurality of second confluence remainders are bonded to each other, the strength of the micromixer can be improved. Therefore, even if pressure acts on the micromixer in the direction perpendicular to the front surface thereof, the shapes of the first confluence channel and the second confluence channel are readily maintained. Moreover, even if high pressure acts on the micromixer via the fluids inside the first confluence channel and the second confluence channel, the micromixer can be resistive to the high pressure because the pressure-receiving areas of the first confluence channel and the second confluence channel are reduced by providing the plurality of first confluence remainders and the plurality of second confluence remainders and bonding the plurality of first confluence remainders and the plurality of second confluence remainders to each other.

In fourth means, the first channel includes a plurality of first branch remainders that are portions where the non-through groove is not formed. The plurality of first branch remainders are bonded to the first lid plate. The second channel includes a plurality of second branch remainders that are portions where the non-through groove is not formed. The plurality of second branch remainders are bonded to the second lid plate.

According to the configuration describe above, the first channel includes the plurality of first branch remainders, which are portions where no non-through groove is formed. The plurality of first branch remainders can therefore change the flow direction of the fluid flowing through the first channel. The flow of the first fluid flowing through the first branch channels, which merge into the first confluence channel, can therefore be complicated, whereby the first fluid and the second fluid can be mixed with each other in a further facilitated manner. Similarly, the flow of the second fluid flowing through the second branch channels, which merge into the second confluence channel, can be complicated, whereby the first fluid and the second fluid can be mixed with each other in a further facilitated manner.

In addition, since the plurality of first branch remainders are bonded to the first lid plate, the strength of the micromixer can be improved. Therefore, even if pressure acts on the micromixer in the direction perpendicular to the front surface thereof, the shape of the first channel is readily maintained. Similarly, even if pressure acts on the micromixer in the direction perpendicular to the front surface thereof, the shape of the second channel is readily maintained. Moreover, even if high pressure acts on the micromixer via the fluids inside the first channel and the second channel, the micromixer can be resistive to the high pressure because the pressure-receiving area of the first channel is reduced by providing the plurality of first branch remainders and bonding the plurality of first branch remainders to the first lid plat. Similarly, the micromixer can be resistive to high pressure because the pressure-receiving area of the second channel is reduced by providing the plurality of second branch remainders and bonding the plurality of second branch remainders to the second lid plate.

In fifth means, the second channel plate is so disposed that the plurality of first branch remainders and the plurality of second branch remainders are overlaid on each other in a projection in a direction perpendicular to the front surface. According to the configuration described above, even if pressure acts on the micromixer in the direction perpendicular to the front surface thereof, the plurality of first branch remainders and the plurality of second branch remainders can indirectly support each other. Therefore, even if pressure in the direction perpendicular to the front surface of the micromixer acts on the micromixer, the shapes of the first channel and the second channel are readily maintained, and the micromixer can be resistive to high pressure.

In sixth means, first branch grooves that are grooves having a depth equal to a depth of the first channel or a depth of the first branch channels are formed at an outer edge of the first channel plate, and first confluence grooves that are grooves having a depth equal to a depth of the first confluence channel but different from the depth of the first branch grooves are formed at the outer edge of the first channel plate.

In the state in which the micromixer has been assembled with the first lid plate, the first channel plate, the second channel plate, and the second lid plate stacked on each other, it is difficult to check the depths of the channels in the plates and whether or not the front side and the rear side of each of the plates properly face.

In this regard, according to the configuration describe above, the first branch grooves, which are grooves having a depth equal to the depth of the first channel or the depth of the first branch channels, are formed at the outer edge of the first channel plate. Therefore, even in the state in which the micromixer has been assembled, the first branch grooves can be checked, and checking the depth of the first branch grooves allows checking of the depth of the first channel or the depth of the first branch channels. Similarly, even in the state in which the micromixer has been assembled, the first confluence grooves can be checked, and checking the depth of the first confluence grooves allows checking of the depth of the first confluence channel.

Furthermore, the first branch grooves differ from the first confluence grooves in terms of depth. If the micromixer is assembled with the front and rear sides of the first channel plate facing incorrectly, the incorrect assembly can be found from the relationship among the front and rear sides of the first channel plate, the depth of the first branch grooves, and the depth of the first confluence grooves.

In seventh means, second confluence grooves that are grooves having a depth equal to a depth of the second confluence channel are formed at an outer edge of the second channel plate, and second branch grooves that are grooves having a depth equal to a depth of the second channel or a depth of the second branch channels but different from the depth of the second confluence grooves are formed at the outer edge of the second channel plate.

According to the configuration describe above, even in the state in which the micromixer has been assembled, the second confluence grooves can be checked, and checking the depth of the second confluence grooves allows checking of the depth of the second confluence channel, as in the sixth means. Furthermore, even in the state in which the micromixer has been assembled, the second branch grooves can be checked, and checking the depth of the second branch grooves allows checking of the depth of the second channel and the depth of the second branch channels.

Furthermore, the second confluence grooves differ from the second branch grooves in terms of depth. If the micromixer is assembled with the front and rear sides of the second channel plate facing incorrectly, the incorrect assembly can be found from the relationship among the front and rear sides of the second channel plate, the depth of the second confluence grooves, and the depth of the second branch grooves.

In eighth means,

- second confluence grooves that are grooves having a depth equal to a depth of the second confluence channel are formed at an outer edge of the second channel plate,
- second branch grooves that are grooves having a depth equal to a depth of the second channel or a depth of the second branch channels but different from the depth of the second confluence grooves are formed at the outer edge of the second channel plate,
- a first lid through hole or a first lid channel is formed in the first lid plate,
- a first lid groove that is a groove having a depth equal to a depth of the first lid through hole or a depth of the first lid channel is formed at an outer edge of the first lid plate,
- a second lid through hole or a second lid channel is formed in the second lid plate,
- a second lid groove that is a groove having a depth equal to a depth of the second lid through hole or a depth of the second lid channel is formed at the outer edge of the second lid plate, and
- in a projection in a direction perpendicular to the front surface, a position of the first lid groove, positions of the first branch grooves, positions of the first confluence grooves, positions of the second confluence grooves, positions of the second branch grooves, and a position of the second lid groove are shifted from one another.

According to the configuration describe above, grooves corresponding to the through holes or the channels formed in each of the plates are formed at the outer edge of the plate. The positions of the grooves are shifted from one another in the projection in the direction perpendicular to the front surface of the plate. Therefore, when there are grooves the positions of which coincide with each other in plates of different types in the projection in the direction perpendicular to the front surface of the plates, it is found that the micromixer has been assembled with any of the plates having an incorrect type, the front and rear sides of any of the plates facing incorrect directions, or the right and left sides of any of the plates facing incorrect directions.

In ninth means, the first branch channels and the second branch channels are alternately disposed in the projection in the direction perpendicular to the front surface. The configuration described above allows the first fluid and the second fluid to alternately flow from the plurality of first branch channels and the plurality of second branch channels into the first confluence channel and the second confluence channel, which communicate with each other, whereby the first fluid and the second fluid can be mixed with each other in a further facilitated manner.

Tenth means is a method for manufacturing the micromixer according to any one of the first to ninth means, the method including

- a first step of simultaneously forming the first channel, the first branch channels, and the first confluence channel in the first channel plate through etching, and
- a second step of simultaneously forming the second channel, the second branch channels, and the second confluence channel in the second channel plate through etching.

According to the first step describe above, the first channel, the plurality of first branch channels, and the first confluence channel are simultaneously formed through etching in the first channel plate. The plurality of first branch channels can therefore be precisely aligned with the first confluence channel, as compared with a case where the plurality of first branch channels are formed in a process separate from the process of forming the first confluence channel. The first branch channels can therefore be made thinner. Similarly, the second branch channels can be made thinner.

Eleventh means is a method for manufacturing the micromixer described in the third means, the method including

- a first step of simultaneously forming the first channel, the first branch channels, and the first confluence channel in the first channel plate through etching, and forming the plurality of first confluence remainders as portions where the etching is not performed in the first confluence channel simultaneously with the formation of the first confluence channel, and
- a second step of simultaneously forming the second channel, the second branch channels, and the second confluence channel in the second channel plate through etching, and forming the plurality of second confluence remainders as portions where the etching is not performed in the second confluence channel simultaneously with the formation of the second confluence channel.

According to the first step describe above, the first channel, the plurality of first branch channels, and the first confluence channel are simultaneously formed in the first channel plate through etching, and the plurality of first confluence remainders are formed as the portions where no etching is performed in the first confluence channel simultaneously with the formation of the first confluence channel. It is therefore not necessary to carry out the step of forming the plurality of first confluence remainders separately from the step of forming the first confluence channel. Similarly, it is not necessary to carry out the step of forming the plurality of second confluence remainders separately from the step of forming the second confluence channel.

When the first confluence channel is formed by a through groove, island-shaped first confluence remainders cannot be formed. In contrast, since the first confluence channel is formed by a non-through groove, island-shaped first confluence remainders can be formed. Similarly, since the second confluence channel is formed by a non-through groove, island-shaped second confluence remainders can be formed.

Twelfth means is a method for manufacturing the micromixer described in the fourth means, the method including a first step of simultaneously forming the first channel, the first branch channels, and the first confluence channel in the first channel plate through etching, and forming the plurality of first branch remainders as portions where the etching is not performed in the first channel simultaneously with the formation of the first channel, and a second step of simultaneously forming the second channel, the second branch channels, and the second confluence channel in the second channel plate through etching, and forming the plurality of second branch remainders as portions where the etching is not performed in the second channel simultaneously with the formation of the second channel.

According to the first step describe above, the first channel, the plurality of first branch channels, and the first confluence channel are simultaneously formed in the first channel plate through etching, and the plurality of first branch remainders are formed as the portions where no etching is performed in the first channel simultaneously with the formation of the first channel. It is therefore not necessary to carry out the step of forming the plurality of first branch remainders separately from the step of forming the first channel. Similarly, it is not necessary to carry out the step of forming the plurality of second branch remainders separately from the step of forming the second channel.

When the first channel is formed by a through groove, island-shaped first branch remainders cannot be formed. In contrast, since the first channel is formed by a non-through groove, island-shaped first branch remainders can be formed. Similarly, since the second channel is formed by a non-through groove, island-shaped second branch remainders can be formed.

BRIEF DESCRIPTION OF DRAWINGS

The features and advantages of the present disclosure will be further clarified by the following detailed description with reference to the accompanying drawings.

DETAILED DESCRIPTION OF EMBODIMENTS

Figure 1:
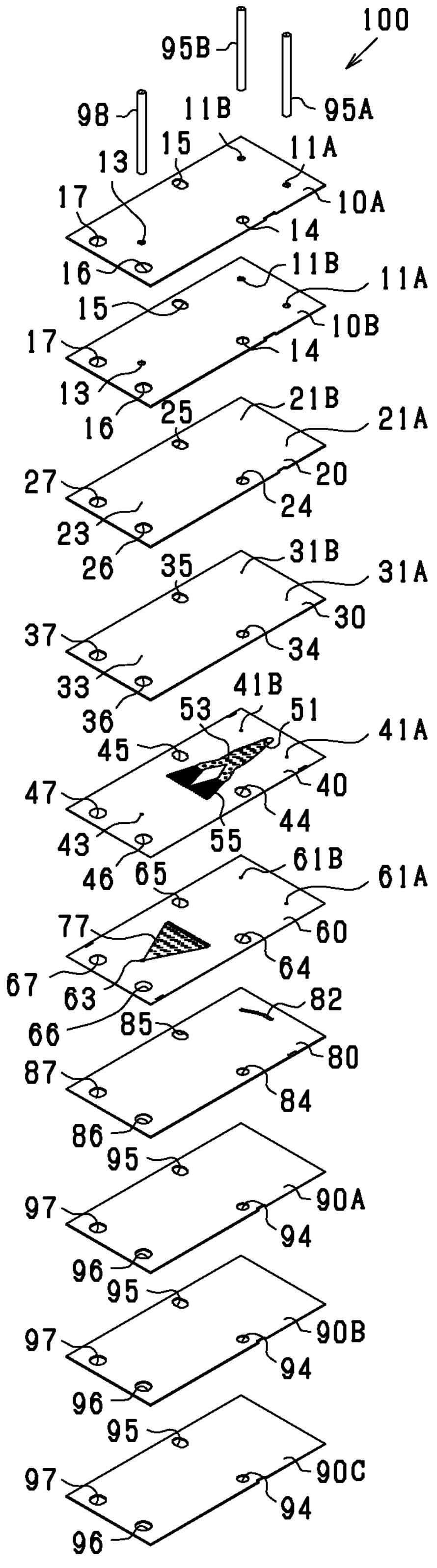
FIG. 1 is an exploded top perspective view of a micromixer.
Figure 2:
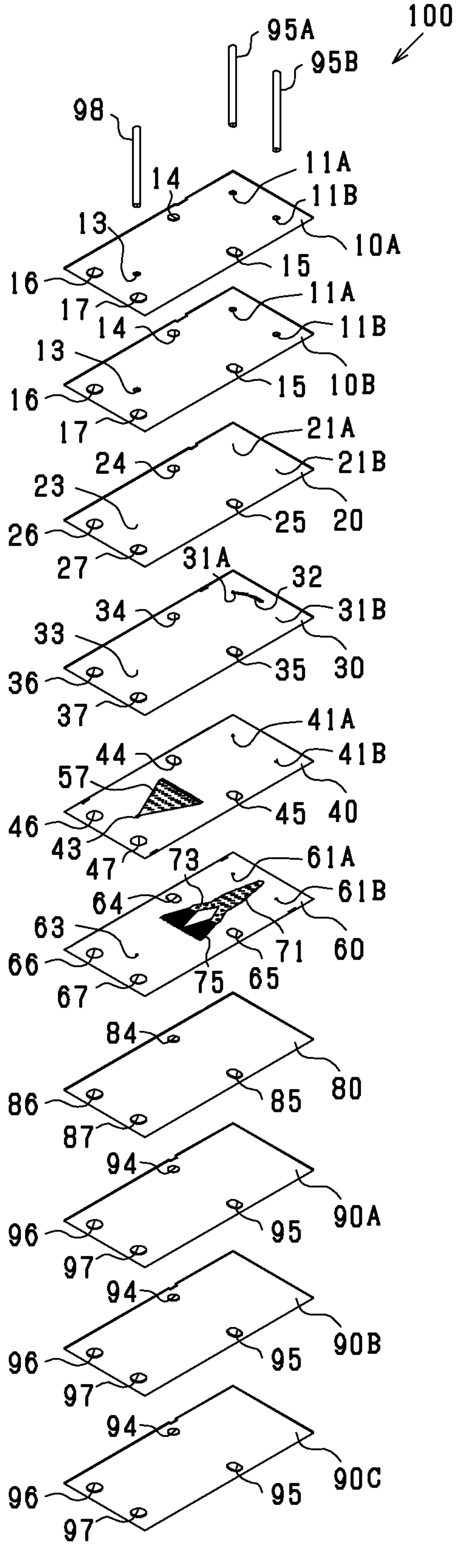
FIG. 2 is an exploded bottom perspective view of the micromixer.

Embodiments that embody a micromixer having channels formed in each plate will be described below with reference to the drawings. FIG. 1 is an exploded top perspective view of a micromixer 100 viewed diagonally below. FIG. 2 is an exploded bottom perspective view of the micromixer 100 viewed diagonally above. The micromixer 100 includes through-hole plates 10A and 10B, a relay channel plate 20, a first inflow channel plate 30, a first channel plate 40, a second channel plate 60, a second inflow channel plate 80, and support plates 90A, 90B, and 90C sequentially arranged from the above, and further includes a first inflow pipe 95A, a second inflow pipe 95B, an outflow pipe 98, and other components, as shown in FIGS. 1 and 2.

The plates 10A, 10B, 20, 30, 40, 60, 80, 90A, 90B, and 90C are each made, for example, of stainless steel and each have the shape of a rectangular plate. The plates 10A, 10B, 20, 30, 40, 60, 80, 90A, 90B, and 90C have the same length in the direction of the long sides of the rectangular shape (lateral width) and in the direction of the short sides of the rectangular shape (longitudinal width). The first channel plate 40 and the second channel plate 60 each have a thickness of 0.05 [mm]. The other plates each have a thickness of 0.15 [mm], which is three times the thickness of each of the first channel plate 40 and the second channel plate 60. The plates 10A, 10B, 20, 30, 40, 60, 80, 90A, 90B, and 90C are each made of general-purpose rolled stainless steel (plate material) specified, for example, by an arbitrary standard or arbitrary material manufacturer's specifications.

The through-hole plates 10A and 10B are identical to each other. The through-hole plates 10A and 10B have a through hole 11A, into which the first inflow pipe 95A is insertable, a through hole 11B, into which the second inflow pipe 95B is insertable, and a through hole 13, into which the outflow pipe 98 is insertable. The first inflow pipe 95A, the second inflow pipe 95B, and the outflow pipe 98 are each made, for example, of stainless steel and formed in a tubular shape. Bolt holes 14 to 17 are formed in each of the through-hole plates 10A and 10B. The bolt holes 14 and 15 may be changed to positioning holes. In the following description, the same holds true for the bolt holes corresponding to the bolt holes 14 and 15 in the other plates.

The through holes 11A and 11B are formed in positions close to a first end (one end) of each of the through-hole plates 10A and 10B out of the ends in the longitudinal direction. The through hole 13 is formed in a position close to a second end (other end) of each of the through-hole plates 10A and 10B out of the ends in the longitudinal direction, that is, the end opposite from the first end. The through holes 11A, 11B, and 13 each have a circular cross-sectional shape. The first inflow pipe 95A, the second inflow pipe 95B, and the outflow pipe 98 each have a circular cross-sectional outer shape (cross-sectional shape). The inner diameter of each of the through holes 11A, 11B, and 13 is slightly greater than the outer diameter of each of the first inflow pipe 95A, the second inflow pipe 95B, and the outflow pipe 98. The outer diameters of the first inflow pipe 95A, the second inflow pipe 95B, and the outflow pipe 98 may be equal to or different from one another. The cross-sectional areas of the channels (pipe channels) in the first inflow pipe 95A, the second inflow pipe 95B, and the outflow pipe 98 may be equal to or different from one another.

Through holes 21A, 21B, 23 (relay channels) are formed in the relay channel plate 20. The through holes 21A, 21B, and 23 are formed in the positions (positions corresponding to through holes 11A, 11B, and 13) that coincide with the centers of the through holes 11A, 11B, and 13, respectively, in the projection (or end portions in the longitudinal direction) in the direction perpendicular to the front surface (upper surface in FIGS. 1 and 2) of the relay channel plate 20 (through-hole plates 10A and 10B). The through holes 21A, 21B, and 23 each have a circular cross-sectional shape. The inner diameters of the through holes 21A, 21B, and 23 are smaller than the outer diameters of the first inflow pipe 95A, the second inflow pipe 95B, and the outflow pipe 98, and are equal to the inner diameters of the first inflow pipe 95A, the second inflow pipe 95B, and the outflow pipe 98, respectively. The inner diameters of the first inflow pipe 95A, the second inflow pipe 95B, and the outflow pipe 98 may be equal to or differ from one another. Bolt holes 24 to 27 are formed in the relay channel plate 20 in the positions corresponding to the bolt holes 14 to 17 described above.

Through holes 31A, 31B, 33 (relay channels) and a non-through groove 32 (first inflow channel, channel) are formed in the first inflow channel plate 30. The through holes 31A, 31B, and 33 are formed in the positions (positions corresponding to through holes 11A, 11B, and 13) that coincide with the centers of the through holes 11A, 11B, and 13, respectively, in the projection (or end portions in the longitudinal direction) in the direction perpendicular to the front surface of the first inflow channel plate 30 (through-hole plates 10A and 10B). That is, the through-hole plates 10A and 10B are disposed so as to be overlaid on the first inflow channel plate 30, and the through hole 11A is formed in a position where the through hole 11A faces the non-through groove 32 (first inflow channel, channel). The channel (pipe channel) in the first inflow pipe 95A is thus connected to the non-through groove 32 via the through holes 21A and 31A (relay channel). The through holes 31A, 31B, and 33 each have a circular cross-sectional shape. The inner diameters of the through holes 31A, 31B, and 33 are smaller than the outer diameters of the first inflow pipe 95A, the second inflow pipe 95B, and the outflow pipe 98, and are equal to the inner diameters of the first inflow pipe 95A, the second inflow pipe 95B, and the outflow pipe 98, respectively.

The non-through groove 32 (see FIG. 2) is a groove that is formed in the rear surface (lower surface in FIGS. 1 and 2) of the first inflow channel plate 30 and does not pass through the first inflow channel plate 30. The non-through groove 32 communicates with the through hole 31A and extends toward the through hole 31B to the center of the first inflow channel plate 30 in the direction of the short sides thereof. The width of the non-through groove 32 is greater than the inner diameter of the through hole 31A, the depth of the non-through groove 32 is smaller than the inner diameter of the through hole 31A, and the cross-sectional area of the non-through groove 32 is roughly equal to the cross-sectional area of the through hole 31A. Bolt holes 34 to 37 are formed in the first inflow channel plate 30 in the positions corresponding to the bolt holes 14 to 17 described above.

The first channel plate 40 (channel plate) has through holes 41A, 41B, and 43 (relay channels), a first channel 51, first branch channels 53 and 55, and a first confluence channel 57. The through holes 41A, 41B, and 43 are formed in the positions (positions corresponding to through holes 11A, 11B, and 13) that coincide with the centers of the through holes 11A, 11B, and 13, respectively, in the projection (or end portions in the longitudinal direction) in the direction perpendicular to the front surface of the first channel plate 40 (through-hole plates 10A and 10B). The through holes 41A, 41B, and 43 each have a circular cross-sectional shape. The inner diameters of the through holes 41A, 41B, and 43 are smaller than the outer diameters of the first inflow pipe 95A, the second inflow pipe 95B, and the outflow pipe 98, and are equal to the inner diameters of the first inflow pipe 95A, the second inflow pipe 95B, and the outflow pipe 98, respectively.

The first channel 51 and the first branch channels 53 and 55 are formed by non-penetrating grooves (grooves that do not pass through plate) in the front surface of the first channel plate 40. In the direction of the long sides of the first channel plate 40, an end of the first channel 51, the end facing the through holes 41A and 41B (end opposite from through hole 43), communicates with the non-through groove 32 (see FIG. 2) of the first inflow channel plate 30. The first confluence channel (see FIG. 2) is formed by a non-through groove in the rear surface of the first channel plate 40. The first channel 51, the first branch channels 53 and 55, and the first confluence channel 57 will be described later in detail. Bolt holes 44 to 47 are formed in the first channel plate 40 in the positions corresponding to the bolt holes 14 to 17 described above.

The through-hole plates 10A and 10B, the relay channel plate 20, and the first inflow channel plate 30 correspond to a first lid plate that covers the front surface of the first channel plate 40.

The second channel plate 60 (channel plate) has through holes 61A, 61B, and 63 (relay channels), a second channel 71, second branch channels 73 and 75, and a second confluence channel 77. The through holes 61A, 61B, and 63 are formed in the positions (positions corresponding to through holes 11A, 11B, and 13) that coincide with the centers of the through holes 11A, 11B, and 13, respectively, in the projection (or end portions in the longitudinal direction) in the direction perpendicular to the front surface of the second channel plate 60 (through-hole plates 10A and 10B). The through holes 61A, 61B, and 63 each have a circular cross-sectional shape. The inner diameters of the through holes 61A, 61B, and 63 are smaller than the outer diameters of the first inflow pipe 95A, the second inflow pipe 95B, and the outflow pipe 98, and are equal to the inner diameters of the first inflow pipe 95A, the second inflow pipe 95B, and the outflow pipe 98, respectively.

The second channel 71 and the second branch channels 73 and 75 (see FIG. 2) are formed by non-through grooves (grooves that do not pass through plate) in the rear surface of the second channel plate 60. The second confluence channel 77 (see FIG. 1) is formed by a non-through groove in the front surface of the second channel plate 60. The second channel 71, the second branch channels 73 and 75, and the second confluence channel 77 will be described later in detail. Bolt holes 64 to 67 are formed in the second channel plate 60 in the positions corresponding to the bolt holes 14 to 17 described above. The second channel plate 60 is identical to the first channel plate 40, and is disposed upside down with respect to the first channel plate 40.

A non-through groove 82 (second inflow channel, channel) is formed in the second inflow channel plate 80. The non-through groove 82 is a groove that is formed in the front surface of the second inflow channel plate 80 and does not pass through the second inflow channel plate 80. The non-through groove 82 communicates with the through hole 61B of the second inflow channel plate 60 and extends toward the through hole 61A to the center of the second inflow channel plate 80 in the direction of the short side thereof. That is, the through-hole plates 10A and 10B are disposed so as to be overlaid on the second inflow channel plate 80, and the through hole 11B is formed in a position where the through hole 11B faces the non-through groove 82 (second inflow channel, channel). The channel (pipe channel) in the second inflow pipe 95B is thus connected to the non-through groove 82 via the through holes 21B, 31B, 41B, and 61B (relay channels). The non-through groove 82 communicates with the second channel 71 of the second channel plate 60. That is, in the direction of the long sides of the second channel plate 60, an end of the second channel 71, the end facing the through holes 61A and 61B (end opposite from through hole 63), communicates with the non-through groove 82 of the second inflow channel plate 80. The width of the non-through groove 82 is greater than the inner diameter of the through hole 61B, the depth of the non-through groove 82 is smaller than the inner diameter of the through hole 61B, and the cross-sectional area of the non-through groove 82 is roughly equal to the cross-sectional area of the through hole 61B. Bolt holes 84 to 87 are formed in the second inflow channel plate 80 in the positions corresponding to the bolt holes 14 to 17 described above.

The support plates 90A, 90B, and 90C are identical to one another. Bolt holes 94 to 97 are formed in the support plates 90A, 90B, and 90C in the positions corresponding to the bolt holes 14 to 17 described above.

The second inflow channel plate 80 and the support plates 90A, 90B, and 90C correspond to a second lid plate that covers the rear surface of the second channel plate 60.

The micromixer 100 is manufactured by laminating the plates 10A, 10B, 20, 30, 40, 60, 80, 90A, 90B, and 90C on each other and performing diffusion bonding (bonding) on each set of adjacent ones of the plates. In the diffusion bonding, the plates 10A, 10B, 20, 30, 40, 60, 80, 90A, 90B, and 90C are pressurized at a predetermined pressure with the plates being heated to a predetermined temperature. The first inflow pipe 95A, the second inflow pipe 95B, and the outflow pipe 98 are inserted into the through holes 11A, 11B, and 13 of the through-hole plates 10A and 10B, respectively, and the first inflow pipe 95A, the second inflow pipe 95B, and the outflow pipe 98 are welded to the through-hole plate 10A (through-hole plate farthest from first inflow channel plate 30 and second inflow channel plate 80). In this process, the first inflow pipe 95A, the second inflow pipe 95B, and the outflow pipe 98 are welded to the through-hole plate 10B and the relay channel plate 20.

The first channel plate 40 will next be described in detail with reference to FIGS. 3 to 10. The second channel plate 60 is identical to the first channel plate 40, is disposed upside down with respect to the first channel plate 40, and will therefore not be described.

Figure 3:
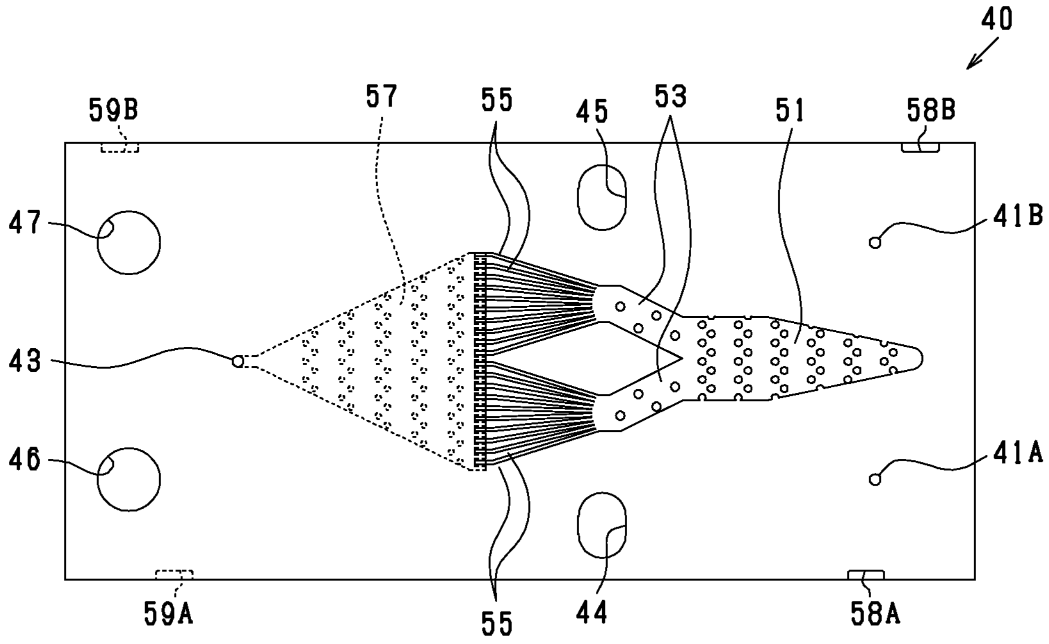
FIG. 3 is a top view showing the front surface of a first channel plate.
Figure 4:
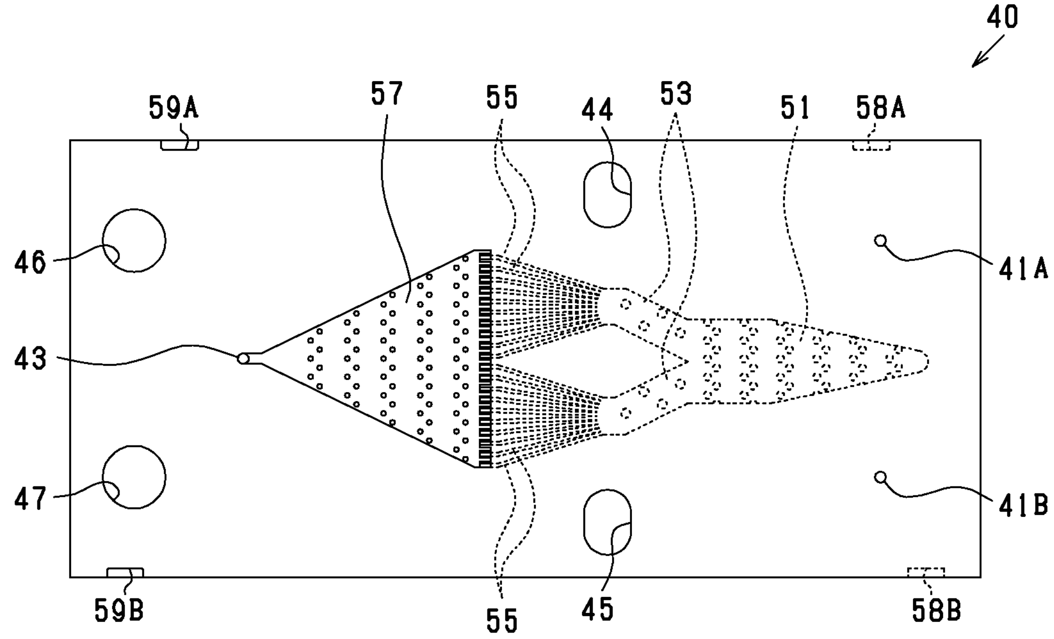
FIG. 4 is a bottom view showing the rear surface of the first channel plate.

FIG. 3 is a top view showing the front surface of the first channel plate 40, and FIG. 4 is a bottom view showing the rear surface of the first channel plate 40.

The first channel 51, the first branch channels 53, and the first branch channels 55 are formed on the roughly right half of the front surface of the first channel plate 40 (roughly half of through holes 41A and 41B) sequentially from the right side (side facing through holes 41A and 41B). The first channel 51 and the first branch channels 53 and 55 (channels) are formed by non-through grooves. The first channel 51 and the first branch channels 53 and 55 have the same depth. The first channel 51 is divided (separated) into two (a plural of) first branch channels 53 (first-stage channels). The first branch channels 53 are each divided (separated) into a large number of (a plural of) first branch channels 55 (second-stage channels). The cross-sectional area of the first channel 51 at the outlet thereof, the sum of the cross-sectional areas of the two first branch channels 53 at the outlets thereof, and the sum of the cross-sectional areas of the large number of first branch channels 55 at the outlet thereof are roughly equal to one another (one to three times area of channel in first inflow pipe 95A). A first communication channel 56 (see FIG. 7) causes ends of the first branch channels (second-stage channels), the ends opposite from the first branch channels 53, to communicate with the first confluence channel 57 described above.

The first confluence channel 57 is formed in the roughly left half (roughly half facing bolt holes 46 and 47) of the rear surface of the first channel plate 40. The first confluence channel 57 is formed by a non-through groove. The depth of the first confluence channel 57 is half (roughly half) the depth of the first channel 51 and the first branch channels 53 and 55. The cross-sectional area of the first confluence channel 57 at the inlet thereof is roughly equal to the sum of the cross-sectional areas of the large number of first branch channels 55 at the outlets thereof (one to three times area of channel in first inflow pipe 95A). The width of the first confluence channel 57 in the direction of the short sides (longitudinal width direction) of the first channel plate 40 gradually decreases from the width including the entirety of the large number of first branch channels 55 to the inner diameter of the through hole 43 as the distance to the bolt holes 46 and 47 decreases (as distance from through holes 41A and 41B increases).

Figure 5:
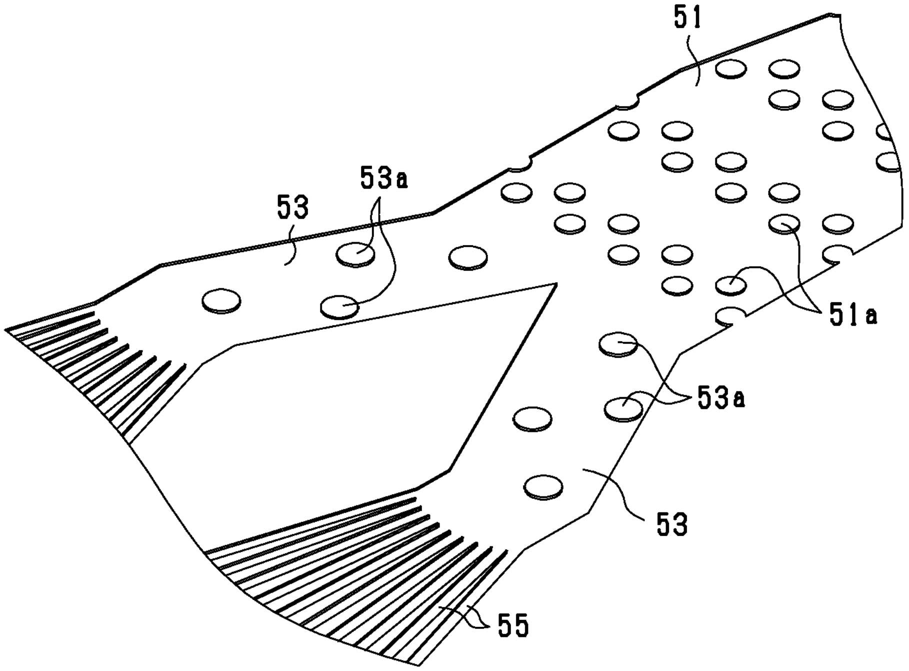
FIG. 5 is an enlarged perspective view showing a first channel and first branch channels.

FIG. 5 is an enlarged perspective view showing the first channel 51 and the first branch channels 53 and 55. The first channel 51 includes a plurality of bosses 51*a*, as shown in FIG. 5. The plurality of bosses 51*a* (first branch remainders) are portions where no non-through groove is formed in the first channel 51. The plurality of bosses 51*a* are each formed in a disc shape (columnar shape, island shape). The first branch channels 53 each include a plurality of bosses 53*a*. The plurality of bosses 53*a* are portions where no non-through groove is formed in the first branch channels 53. The plurality of bosses 53*a* are each formed in a disc shape (columnar shape, island shape).

Figure 6:
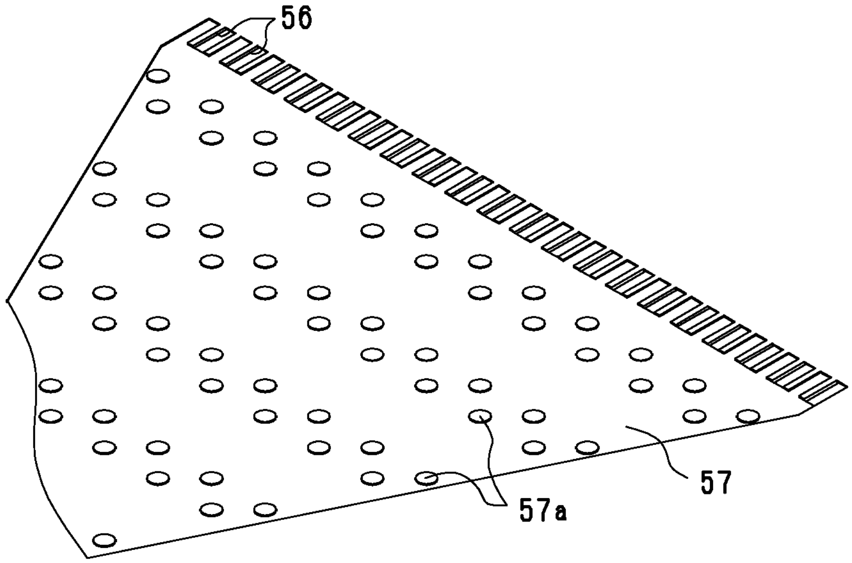
FIG. 6 is an enlarged perspective view showing a first confluence channel.

FIG. 6 is an enlarged perspective view showing the first confluence channel 57. The first confluence channel 57 includes a plurality of bosses 57*a*, as shown in FIG. 6. The plurality of bosses 57*a* (first confluence remainders) are portions where no non-through groove is formed in the first confluence channel 57. The plurality of bosses 57*a* are each formed in a disc shape (columnar shape, island shape). The first communication channel 56 causes an end of the first confluence channel 57, the end facing the first channel 51 (end opposite from through hole 43), to communicate with the first branch channels 55.

The second channel plate 60 is identical to the first channel plate 40. The second channel plate 60 therefore includes the second channel 71, the second branch channels 73 (first-stage channels), the second branch channels 75 (second-stage channel), and the second confluence channel 77, which are identical to the first channel 51, the first branch channels 53, the first branch channels 55, and the first confluence channel 57, respectively. The second channel plate 60 includes a plurality of bosses 71*a* (second branch remainders), a plurality of bosses 73*a*, and a plurality of bosses 77*a* (second confluence remainders) identical to the plurality of bosses 51*a*, a plurality of bosses 53*a*, and the plurality of bosses 57*a*, respectively. The second channel plate 60 is so disposed that the first confluence channel 57 and the second confluence channel 77 face each other and communicate with each other. In the configuration described above, the second channel plate 60 is so disposed that the plurality of bosses 51*a* are overlaid on the plurality of bosses 71*a* and the plurality of bosses 53*a* are overlaid on the plurality of bosses 73*a* in the projection in the direction perpendicular to the front surface of the second channel plate 60.

The plurality of bosses 57*a* of the first channel plate 40 and the plurality of bosses 77*a* of the second channel plate 60 are bonded to each other in diffusion bonding (bonding). The plurality of bosses 51*a* and the plurality of bosses 53*a* are bonded to the first inflow channel plate 30 in diffusion bonding (bonding). The plurality of bosses 71*a* and the plurality of bosses 73*a* are bonded to the second inflow channel plate 80 in diffusion bonding (bonding).

Figure 7:
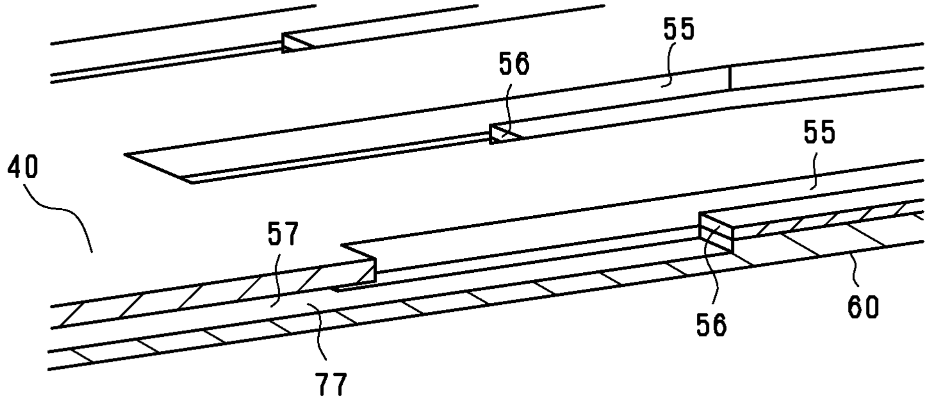
FIG. 7 is a cross-sectional perspective view showing the first branch channels, a first communication channel, the first confluence channel, and a second confluence channel.

FIG. 7 is a cross-sectional perspective view showing the first branch channels 55, the first communication channel 56, the first confluence channel 57, and the second confluence channel 77. FIG. 7 shows the cross section of a first branch channel 55 taken along the plane passing through the center of the first channel plate 40 in the direction of the short sides thereof. The second branch channels 75 described above are each disposed between the first branch channels 55 adjacent to each other in the direction of the short sides of the first channel plate 40 (second channel plate 60). That is, the first branch channels 55 and the second branch channels 75 are alternately arranged in the direction of the short sides of the first channel plate 40 (in the projection in direction perpendicular to front surface of the first channel plate 40). The first communication channel 56 causes the first branch channels 55 to communicate with the first confluence channel 57. The first confluence channel 57 of the first channel plate 40 and the second confluence channel 77 of the second channel plate 60 face each other and communicate with each other.

Figure 8:
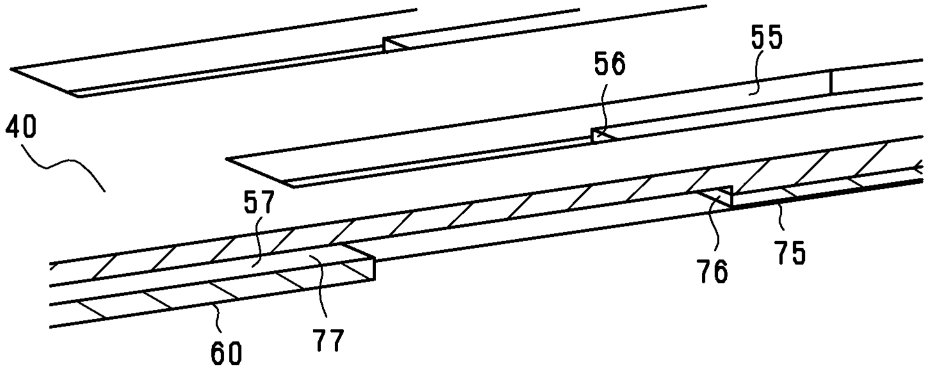
FIG. 8 is a cross-sectional perspective view showing second branch channels, a second communication channel, the first confluence channel, and the second confluence channel.

FIG. 8 is a cross-sectional perspective view showing the second branch channels 75, the second communication channel 76, the first confluence channel 57, and the second confluence channel 77. FIG. 8 shows the cross section of a second branch channel 75 taken along the plane passing through the center of the first channel plate 40 in the direction of the short sides thereof. The first branch channels 55 described above are each disposed between the second branch channels 75 adjacent to each other in the direction of the short sides of the second channel plate 60 (first channel plate 40). That is, the first branch channels 55 and the second branch channels 75 are alternately arranged in the direction of the short sides of the second channel plate 60. The second communication channel 76 causes the second branch channels 75 to communicate with the second confluence channel 77. The first confluence channel 57 of the first channel plate 40 and the second confluence channel 77 of the second channel plate 60 face each other and communicate with each other.

Figure 9:
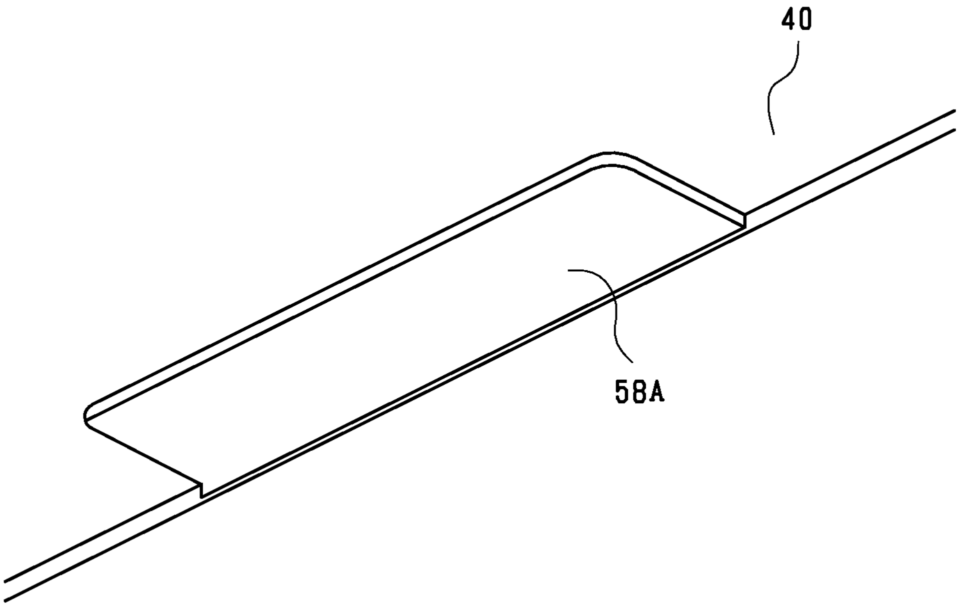
FIG. 9 is an enlarged perspective view showing a first branch groove.

First branch grooves 58A and 58B, which are non-through grooves (grooves) having a depth equal to the depth of the first channel 51 and the first branch channels 53 and 55, are formed at the outer edge of the front surface of the first channel plate 40, as shown in FIG. 3. The first branch groove 58A is formed at one end of the first channel plate 40 in the direction of the short sides thereof, and the first branch groove 58B is formed at the other end of the first channel plate 40 in the direction of the short sides thereof. That is, the first branch grooves 58A and 58B are visible sideways even after the first inflow channel plate 30 and the second channel plate 60 are bonded to the top and bottom of the first channel plate 40, respectively. In the direction of the long sides of the first channel plate 40, the position of the first branch groove 58A and the position of the first branch groove 58B are shifted from each other. FIG. 9 is an enlarged perspective view showing the first branch groove 58A. Furthermore, the first channel plate 40 and the second channel plate 60 are identical to each other and are so disposed that one of the plates is turned upside down with respect to the other. The formed first branch groove 58A or first branch groove 58B can be visually recognized from one side, whereby the efficiency of inspection of the micromixer 100 can be improved.

First confluence grooves 59A and 59B, which are non-through grooves (grooves) having a depth equal to the depth of the first confluence channel 57, are formed at the outer edge of the rear surface of the first channel plate 40, as shown in FIG. 4. The depth of the first confluence grooves 59A and 59B is half (roughly half) the depth of the first branch grooves 58A and 58B. That is, the depth of the first confluence grooves 59A and 59B differs from the depth of the first branch grooves 58A and 58B. The first confluence groove 59A is formed at one end of the first channel plate 40 in the direction of the short sides thereof, and the first confluence groove 59B is formed at the other end of the first channel plate 40 in the direction of the short sides thereof.

Figure 10:
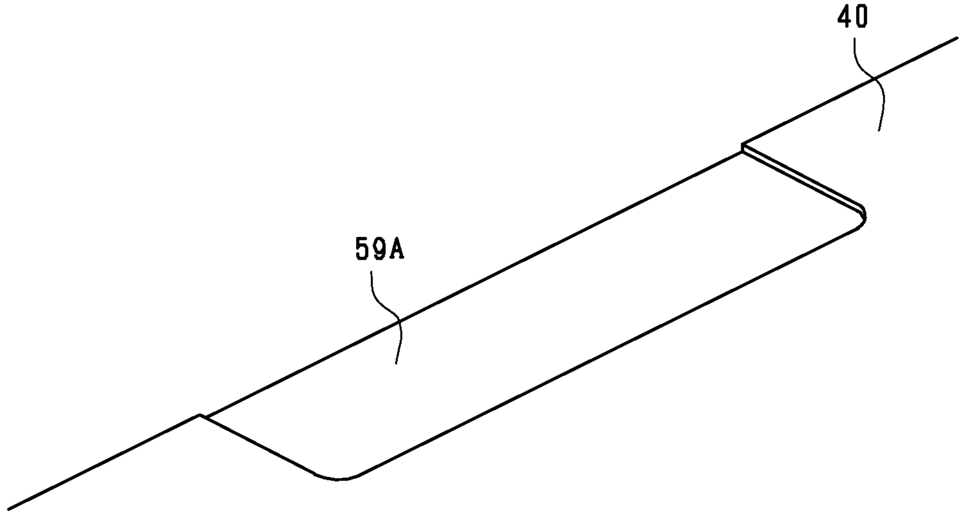
FIG. 10 is an enlarged perspective view showing the first confluence groove.

That is, the first confluence grooves 59A and 59B are visible sideways even after the first inflow channel plate 30 and the second channel plate 60 are bonded to the top and bottom of the first channel plate 40, respectively. In the direction of the long sides of the first channel plate 40, the position of the first branch groove 58A, the position of the first branch groove 58B, the position of the first confluence groove 59A, and the position of the first confluence groove 59B are shifted from one another. FIG. 10 is an enlarged perspective view showing the first confluence groove 59A.

Second branch grooves 78A and 78B and second confluence grooves 79A and 79B, which are identical to the first branch grooves 58A and 58B and the first confluence grooves 59A, 59B, respectively, are formed in the second channel plate 60. The second branch grooves 78A and 78B are visible sideways even after the first channel plate 40 and the second inflow channel plate 80 are bonded to the top and bottom of the second channel plate 60, respectively. The second confluence grooves 79A and 79B are visible sideways even after the first channel plate 40 and the second inflow channel plate 80 are bonded to the top and bottom of the second channel plate 60, respectively. Furthermore, the second branch groove 78A (79A) or second branch groove 78B (79B) can be visually recognized from one side, whereby the efficiency of inspection of the micromixer 100 is improved.

The through holes 11A and 11B (first lid through holes), the through holes 21A and 21B (first lid through holes), and the non-through groove 32 (first lid channel) are formed in the through-hole plates 10A and 10B, the relay channel plate 20, and the first inflow channel plate 30, respectively. First lid grooves that are grooves having depths equal to the depths of the through holes 11A and 11B, the through holes 21A and 21B, and the non-through groove 32 are formed at outer edges of the through-hole plates 10A and 10B, the relay channel plate 20, and the first inflow channel plate 30, respectively.

Similarly, the non-through groove 82 (second lid channel) and the bolt holes 94 to 97 (second lid through holes) are formed in the second inflow channel plate 80 and the support plates 90A, 90B, and 90C, respectively. Second lid grooves that are grooves having depths equal to the depths of the non-through groove 82 and the bolt holes 94 to 97 are formed at the outer edges of the second inflow channel plate 80 and the support plates 90A, 90B, and 90C, respectively.

In the projection in the direction perpendicular to the front surface of each of the plates described above, the positions of the first lid grooves, the positions of the first branch grooves 58A and 58B, the positions of the first confluence grooves 59A and 59B, the positions of the second confluence grooves 79A and 79B, the positions of the second branch grooves 78A and 78B, and the positions of the second lid grooves are shifted from one another.

A method for manufacturing the micromixer 100 will next be described.

The through holes and grooves of each of the plates are formed through wet etching (etching). In the etching of each of the plates, all through holes and grooves to be formed in the plate are formed simultaneously. Therefore, for example, the first channel 51, the first branch channels 53 and 55, and the first branch grooves 58A and 58B formed in the front surface of the first channel plate 40 have the same depth.

The first channel 51, the first branch channels 53 and 55, and the first branch grooves 58A and 58B are formed in the front surface of the first channel plate 40, and at the same time, the first confluence channel 57 and the first confluence grooves 59A and 59B are formed in the rear surface of the first channel plate 40. In this process, the speed at which the front surface of the first channel plate 40 is etched is adjusted to twice (roughly twice) the speed at which the rear surface of the first channel plate 40 is etched.

Similarly, the second confluence channel 77 and the second confluence grooves 79A and 79B are formed in the front surface of the second channel plate 60, and at the same time, the second channel 71, the second branch channels 73 and 75, and the second branch grooves 78A and 78B are formed in the rear surface of the second channel plate 60. In this process, the speed at which the rear surface of the second channel plate 60 is etched is adjusted to twice (roughly twice) the speed at which the front surface of the second channel plate 60 is etched.

The plurality of bosses 57*a* are formed as portions where no etching is performed in the first confluence channel 57 simultaneously with the formation of the first confluence channel 57. The plurality of bosses 51*a* are formed as portions where no etching is performed in the first channel 51 simultaneously with the formation of the first channel 51. The plurality of bosses 53*a* are formed as portions where no etching is performed in the first branch channel 53 simultaneously with the formation of the first branch channel 53.

Similarly, the plurality of bosses 77*a* are formed as portions where no etching is performed in the second confluence channel 77 simultaneously with the formation of the second confluence channel 77. The plurality of bosses 71*a* are formed as portions where no etching is performed in the second channel 71 simultaneously with the formation of the second channel 71. The plurality of bosses 73*a* are formed as portions where no etching is performed in the second branch channel 73 simultaneously with the formation of the second branch channel 73.

Thereafter, the plates 10A, 10B, 20, 30, 40, 60, 80, 90A, 90B, and 90C are laminated on each other, and bolts are inserted into the bolt holes of each of the plates and fastened with nuts. With the plates pressurized by a pressurizer, heat is applied to the plates to bond the plates to each other in diffusion bonding. Since the plates are made of rolled stainless steel, the smoothness of the surfaces of the plates can be ensured, whereby the diffusion bonding can be smoothly performed.

An operator, a robot, or any other production machine welds the first inflow pipe 95A to the through-hole plate 10A in the procedure below. The second inflow pipe 95B and the outflow pipe are welded to the through-hole plate 10A in the same procedure.

Figure 11:
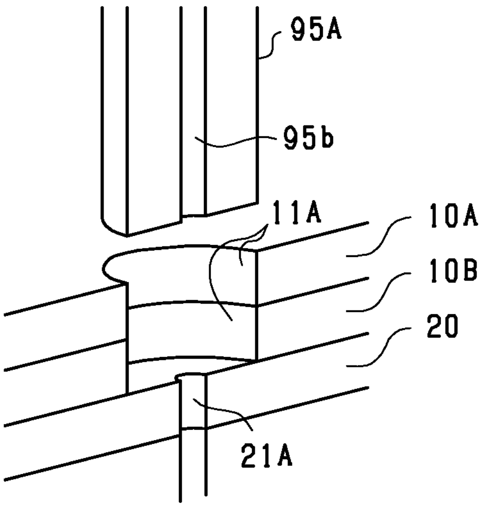
FIG. 11 is a cross-sectional perspective view showing through holes of through-hole plates and a through hole of a relay channel plate.

FIG. 11 is a cross-sectional perspective view showing the through holes 11A of the through-hole plates 10A and 10B and the through hole 21A of the relay channel plate 20. The first inflow pipe 95A is inserted into each of the through holes 11A of the through-hole plates 10A and 10B. The inner diameter of the through hole 21A of the relay channel plate 20 is smaller than the outer diameter of the first inflow pipe 95A and is equal to the inner diameter of a channel 95*b* in the first inflow pipe 95A. The first inflow pipe 95A can therefore be brought into contact with the periphery of the through hole 21A of the relay channel plate 20.

Figure 12:
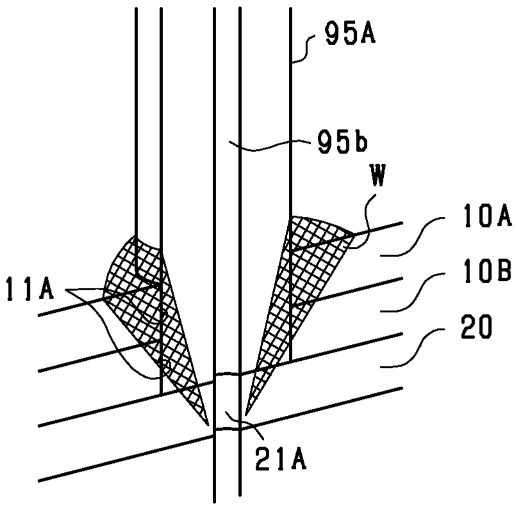
FIG. 12 is a cross-sectional perspective view showing a welded portion where a first inflow pipe is welded to the through-hole plates.

FIG. 12 is a cross-sectional perspective view showing a welded portion W, where the first inflow pipe 95A is welded to the through-hole plates 10A and 10B. An operator, a robot, or a production machine inserts the first inflow pipe 95A into each of the through holes 11A of the through-hole plates 10A and 10B, as shown in FIG. 11, and then uses laser welding to weld the first inflow pipe 95A to the through-hole plate 10A. In detail, on the front surface of the through-hole plate 10A, a boundary portion between the through hole 11A and the first inflow pipe 95A is irradiated with laser light. The position irradiated with the laser light is then rotated relative to the laser light in the circumferential direction of the through hole 11A. The through-hole plate 10A and the first inflow pipe 95A are thus melted to form the welded portion W.

A first fluid flows into the micromixer 100 having the configuration described above via the first inflow pipe 95A, and a second fluid flows into the micromixer 100 via the second inflow pipe 95B, as shown in FIG. 1. In this process, a pressure of 100 [MPa] or higher is applied to the first fluid and the second fluid in some cases. For example, the first fluid is a first chemical liquid (liquid), and the second fluid is a second chemical liquid (liquid) different from the first chemical liquid.

The first fluid flows into the first confluence channel 57 sequentially through the through holes 21A and 31A, the non-through groove 32, the first channel 51, the first branch channels 53 and 55, and the first communication channel 56. The second fluid flows into the second confluence channel 77 sequentially through the through holes 21B, 31B, 41B, and 61B, the non-through groove 82, the second channel 71, the second branch channels 73 and 75, and the second communication channel 76. The first confluence channel 57 and the second confluence channel 77 communicate with each other, so that the first fluid and the second fluid alternately flow into the first confluence channel 57 and the second confluence channel 77 and are mixed with each other. The first fluid and the second fluid flow through the first confluence channel 57 and the second confluence channel 77, the width of each of which gradually decreases, and are further mixed with each other. The mixture of the first fluid and the second fluid flows out of the outflow pipe 98 sequentially via the through holes 63, 43, 33, and 23.

One or more embodiments having been described above in detail have the following advantages.

- Since the plurality of first branch channels 53 and 55 are each formed by a non-through groove, the periphery of the portion between the first branch channels 53 or the periphery of the portions between the first branch channels 55 is not cut by the first branch channels 53 or 55. Therefore, even when the first branch channels 53 and 55, the portion between the first branch channels 53, and the portions between the first branch channels 55 are made thinner, the strength of the portion between the first branch channels 53 and the portions between the first branch channels 55 can be ensured.
- The first confluence channel 57 is formed by a non-through groove in the rear surface of the first channel plate 40. The first communication channel 56, which causes the plurality of first branch channels 53 and 55 to communicate with the first confluence channel 57, is formed in the first channel plate 40. The first fluid is therefore allowed to flow through the first channel 51, which branches off into the plurality of first branch channels 53 and 55, which then merge into the first confluence channel 57 via the first communication channel 56.
- Similarly, even when the second branch channels 73 and 75 are each made thinner, the strength of the portion between the second branch channels 73 and the portions between the second branch channels 75 can be ensured. The second fluid is allowed to flow through the second channel 71, which branches off into the plurality of second branch channels 73 and 75, which then merge into the second confluence channel 77 via the second communication channel 76. The second channel plate 60 is so disposed that the first confluence channel 57 and the second confluence channel 77 face each other and communicate with each other. Therefore, the first fluid flowing through the plurality of first branch channels 55, which merge into the first confluence channel 57, and the second fluid flowing through the plurality of second branch channels 75, which merge into the second confluence channel 77, can be mixed with each other in the first confluence channel 57 and the second confluence channel 77, which communicate with each other, whereby the first fluid and the second fluid can be mixed with each other in a facilitated manner.
- The first confluence channel 57 is formed in the rear surface of the first channel plate 40, and the second confluence channel 77 is formed in the front surface of the second channel plate 60. It is therefore not necessary to prepare a plate for forming a confluence channel (mixing plate in Japanese Patent No. 4,403,943, for example) separately from the first channel plate and the second channel plate 60. The channels of the micromixer 100 can therefore be formed with a smaller number of plates.
- In the first channel plate 40, the plurality of first branch channels 53 and 55 include the plurality of first branch channels 53, into which the first channel 51 is divided, and the plurality of first branch channels 55, into which each of the first branch channels 53 is divided. The flow rate distribution of the first fluid in the first branch channels 53 can therefore be made smaller than the flow rate distribution of the first fluid in the first channel 51 having a configuration in which the first channel 51 extends for a long distance. Differences in the flow rate of the first fluid flowing through the plurality of first branch channels 55 can therefore be suppressed. Similarly, in the second channel plate 60, differences in the flow rate of the second fluid flowing through the plurality of second branch channels 75 can be suppressed.
- The first communication channel 56 causes the plurality of first branch channels 55 (second-stage channels) in the plurality of first branch channels 53 and 55 to communicate with the first confluence channel 57. The second communication channel 76 causes the plurality of second branch channels 75 (second-stage channels) in the plurality of second branch channels 73 and 75 to communicate with the second confluence channel 77. The first fluid flowing through the plurality of first branch channels 55, which merge into the first confluence channel 57, in the first channel plate 40 and the second fluid flowing through the plurality of second branch channels 75, which merge into the second confluence channel 77, in the second channel plate 60 can therefore be mixed with each other more uniformly, whereby the first fluid and the second fluid can be mixed with each other in a further facilitated manner. As a result, the size and capacity of the micromixer 100 can be reduced, and when the micromixer 100 is used in liquid chromatography, the responsiveness to a change in the mixing ratio between the first fluid and the second fluid can be improved.
- The first confluence channel 57 includes the plurality of bosses 57*a*, which are portions where no non-through groove is formed. The plurality of bosses 57*a* can therefore change the flow direction of the fluid flowing through the first confluence channel 57, and hence mix the first fluid and the second fluid with each other in a further facilitated manner. Similarly, the plurality of bosses 77*a* can change the flow direction of the fluid flowing through the second confluence channel 77, and hence mix the first fluid and the second fluid with each other in a further facilitated manner.

Since the plurality of bosses 57*a* and the plurality of bosses 77*a* are bonded to each other, the strength of the micromixer 100 can be improved. Therefore, even if pressure acts on the micromixer 100 in the direction perpendicular to the front surface thereof, the shapes of the first confluence channel 57 and the second confluence channel 77 are readily maintained. Furthermore, the micromixer 100 can be resistive to high pressure, and even when the first fluid and the second fluid are pressurized at a pressure of 100 [MPa] or higher, damage of the micromixer 100 can be suppressed. Moreover, even if high pressure acts on the micromixer 100 via the fluids inside the first confluence channel 57 and the second confluence channel 77, the micromixer 100 can be resistive to the high pressure because the pressure-receiving areas of the first confluence channel 57 and the second confluence channel 77 are reduced by providing the plurality of bosses 57*a* and the plurality of bosses 77*a* and bonding the plurality of bosses 57*a* and the plurality of bosses 77*a* to each other.

The first channel 51 includes the plurality of bosses 51*a*, which are portions where no non-through groove is formed. The plurality of bosses 51*a* can therefore change the flow direction of the fluid flowing through the first channel 51. The flow of the first fluid flowing through the first branch channels 55, which merge into the first confluence channel 57, can therefore be complicated, whereby the first fluid and the second fluid can be mixed with each other in a further facilitated manner. Similarly, the flow of the second fluid flowing through the second branch channels 75, which merge into the second confluence channel 77, can be complicated, whereby the first fluid and the second fluid can be mixed with each other in a further facilitated manner.

Since the plurality of bosses 51*a* are bonded to the first inflow channel plate 30, the strength of the micromixer 100 can be improved. Therefore, even if pressure acts on the micromixer 100 in the direction perpendicular to the front surface thereof, the shape of the first channel 51 is readily maintained. Similarly, even if pressure acts on the micromixer 100 in the direction perpendicular to the front surface thereof, the shape of the second channel 71 is readily maintained. Moreover, even if high pressure acts on the micromixer 100 via the fluids inside the first channel 51 and the second channel 71, the micromixer 100 can be resistive to the high pressure because the pressure-receiving area of the first channel 51 is reduced by providing the plurality of bosses 51*a* and bonding the plurality of bosses 51*a* to the first inflow channel plate 30. Similarly, the micromixer 100 can be resistive to high pressure because the pressure-receiving area of the second channel 71 is reduced by providing the plurality of bosses 71*a* and bonding the plurality of bosses 71*a* to the second inflow channel plate 80.

The second channel plate 60 is so disposed that the plurality of bosses 51*a* are overlaid on the plurality of bosses 71*a* in the projection in the direction perpendicular to the front surface of the second channel plate 60. According to the configuration described above, even if pressure acts on the micromixer 100 in the direction perpendicular to the front surface thereof, the plurality of bosses 51*a* and the plurality of bosses 71*a* can indirectly support each other. Therefore, even if pressure in the direction perpendicular to the front surface of the micromixer 100 acts on the micromixer 100, the shapes of the first channel 51 and the second channel 71 are readily maintained, and the micromixer 100 can be resistive to high pressure. Furthermore, in the diffusion bonding, the dispersion of pressure can be suppressed, whereby the bonding strength can be increased.

In the state in which the micromixer 100 has been assembled with the first inflow channel plate 30, the first channel plate 40, the second channel plate 60, and the second inflow channel plate 80 stacked on each other, it is difficult to check the depths of the channels in the plates 30, 40, 60, and 80 and whether or not the front side and the rear side of each of the plates 30, 40, 60, and 80 properly face. In this regard, the first branch grooves 58A and 58B, which are grooves having a depth equal to the depth of the first channel 51 and the first branch channels 53 and 55, are formed at the outer edge of the first channel plate 40. Therefore, even in the state in which the micromixer 100 has been assembled, the first branch grooves 58A and 58B can be checked, and checking the depth of the first branch grooves 58A and 58B allows checking of the depth of the first channel 51 and the depth of the first branch channels 53 and 55. Similarly, even in the state in which the micromixer 100 has been assembled, the first confluence grooves 59A and 59B can be checked, and checking the depth of the first confluence grooves 59A and 59B allows checking of the depth of the first confluence channel 57.

The first branch grooves 58A and 58B differ from the first confluence grooves 59A and 59B in terms of depth. If the micromixer 100 is assembled with the front and rear sides of the first channel plate 40 facing incorrectly, the incorrect assembly can be found from the relationship among the front and rear sides of the first channel plate 40, the depth of the first branch grooves 58A and 58B, and the depth of the first confluence grooves 59A and 59B.

Even in the state in which the micromixer 100 has been assembled, the second confluence grooves 79A and 79B can be checked, and checking the depth of the second confluence grooves 79A and 79B allows checking of the depth of the second confluence channel 77. Furthermore, even in the state in which the micromixer 100 has been assembled, the second branch grooves 78A and 78B can be checked, and checking the depth of the second branch grooves 78A and 78B allows checking of the depth of the second channel 71 and the depth of the second branch channels 73 and 75.

The second confluence grooves 79A and 79B differ from the second branch grooves 78A and 78B in terms of depth. If the micromixer 100 is assembled with the front and rear sides of the second channel plate 60 facing incorrectly, the incorrect assembly can be found from the relationship among the front and rear sides of the second channel plate 60, the depth of the second confluence grooves 79A and 79B, and the depth of the second branch grooves 78A and 78B.

Grooves corresponding to the through holes or the channels formed in each of the plates are formed at the outer edge of the plate. The positions of the grooves are shifted from one another in the projection in the direction perpendicular to the front surface of the plate. Therefore, when there are grooves the positions of which coincide with each other in plates of different types in the projection in the direction perpendicular to the front surface of the plates, it is found that the micromixer 100 has been assembled with any of the plates having an incorrect type, the front and rear sides of any of the plates facing incorrect directions, or the right and left sides of any of the plates facing incorrect directions.

In the projection in the direction perpendicular to the front surface of the micromixer 100, the first branch channels 55 and the second branch channels 75 are alternately disposed. The configuration described above allows the first fluid and the second fluid to alternately flow from the plurality of first branch channels 55 and the plurality of second branch channels into the first confluence channel 57 and the second confluence channel 77, which communicate with each other, whereby the first fluid and the second fluid can be mixed with each other in a further facilitated manner.

The first channel 51, the plurality of first branch channels 53 and 55, and the first confluence channel 57 are simultaneously formed through etching in the first channel plate 40. The plurality of first branch channels 53 and 55 can therefore be precisely aligned with the first confluence channel 57, as compared with a case where the plurality of first branch channels 53 and 55 are formed in a process separate from the process of forming the first confluence channel 57. The first branch channels 53 and 55 can therefore be made thinner. Similarly, the second branch channels 73 and 75 can be made thinner.

In the first channel plate 40, the first channel 51, the plurality of first branch channels 53 and 55, and the first confluence channel 57 are simultaneously formed through etching, and the plurality of bosses 57*a* are formed as the portions where no etching is performed in the first confluence channel 57 simultaneously with the formation of the first confluence channel 57. It is therefore not necessary to carry out the step of forming the plurality of bosses 57*a* separately from the step of forming the first confluence channel 57. Similarly, it is not necessary to carry out the step of forming the plurality of bosses 77*a* separately from the step of forming the second confluence channel 77.

When the first confluence channel 57 is formed by a through groove, the island-shaped bosses 57*a* cannot be formed. In contrast, since the first confluence channel 57 is formed by a non-through groove, the island-shaped bosses 57*a* can be formed. Similarly, since the second confluence channel 77 is formed by a non-through groove, the island-shaped bosses 77*a* can be formed.

In the first channel plate 40, the first channel 51, the plurality of first branch channels 53 and 55, and the first confluence channel 57 are simultaneously formed through etching, and the plurality of bosses 51*a* are formed as the portions where no etching is performed in the first channel 51 simultaneously with the formation of the first channel 51. It is therefore not necessary to carry out the step of forming the plurality of bosses 51*a* separately from the step of forming the first channel 51. Similarly, it is not necessary to carry out the step of forming the plurality of bosses 71*a* separately from the step of forming the second channel 71.

When the first channel 51 is formed by a through groove, the island-shaped bosses 51*a* cannot be formed. In contrast, since the first channel 51 is formed by a non-through groove, the island-shaped bosses 51*a* can be formed. Similarly, since the second channel 71 is formed by a non-through groove, the island-shaped bosses 71*a* can be formed.

The through holes 11A are formed in the plurality of through-hole plates 10A and 10B in the positions where the through holes 11A face the non-through groove 32. The channel 95*b* is formed in the first inflow pipe 95A, and the channel 95*b* is connected to the non-through groove 32. The first inflow pipe 95A is inserted into the through holes 11A of the plurality of through-hole plates 10A and 10B. The depth of the through holes into which the first inflow pipe 95A is inserted can therefore be adjusted by forming each of the through-hole plates 10A and 10B from a general-purpose thin plate that complies with a standard or specifications and adjusting the number of through-hole plates 10A and 10B. The depth of the through holes into which the first inflow pipe 95A is inserted is therefore readily adjusted.

The first inflow pipe 95A is welded to the through-hole plate 10A (hereinafter referred to as "outermost through-hole plate 10A") farthest from the first inflow channel plate 30 (first channel plate 40). Therefore, after the first inflow pipe 95A is inserted into the through holes 11A of the plurality of through-hole plates 10A and 10B, the first inflow pipe 95A can be readily welded to the through-hole plate 10A in the insertion direction.

The relay channel plate 20 is disposed between the first channel plate 40 and the through-hole plates 10A, 10B. The through hole 21A, which causes the non-through groove 32 to communicate with the channel 95*b* in the first inflow pipe 95A, is formed in the relay channel plate 20. The first fluid is therefore allowed to flow through the path between the non-through groove 32 and the channel 95*b* in the first inflow pipe 95A via the through hole 21A.

In the insertion step, the first inflow pipe 95A is inserted into the through holes 11A of the plurality of through-hole plates 10A and 10B. Thereafter, in the welding step, the first inflow pipe 95A is welded to the through-hole plate 10A farthest from the first inflow channel plate 30. Therefore, after the first inflow pipe 95A is inserted into the through holes 11A of the plurality of through-hole plates 10A and 10B, the first inflow pipe 95A can be readily welded to the through-hole plate 10A in the insertion direction. In this process, the first inflow pipe 95A can be welded to the through-hole plate 10B and the relay channel plate 20.

In the formation step, the through holes 11A are formed through etching in the through-hole plates 10A and 10B. According to the step described above, the processing cost can be typically reduced as compared with a case where the through holes 11A are formed through machining.

It is noted that the embodiments described above can be modified and implemented as follows. The same portions as those in the embodiments described above have the same reference characters and will not be described.

In the projection in the direction perpendicular to the front surface of the micromixer 100, at least two of the first lid grooves, the first branch grooves 58A and 58B, the first confluence grooves 59A and 59B, the second branch grooves 78A and 78B, the second confluence grooves 79A and 79B, and the second lid grooves may have the same position. At least one of the first lid grooves, the first branch grooves 58A and 58B, the first confluence grooves 59A and 59B, the second branch grooves 78A and 78B, the second confluence grooves 79A and 79B, and the second lid grooves may be omitted.

In the projection in the direction perpendicular to the front surface of the micromixer 100, the positions of the bosses 51*a* and the positions of the bosses 71*a* may be shifted from each other, or the positions of the bosses 53*a* and the positions of the bosses 73*a* may be shifted from each other. At least one of the sets of bosses 51*a*, 53*a*, 71*a*, and 73*a* can be omitted.

The positions of the bosses 57*a* and the positions of the bosses 77*a* may be shifted from each other in the projection in the direction perpendicular to the front surface of the micromixer 100. At least one of the sets of bosses 57*a* and 77*a* can be omitted.

In the first channel plate 40, the first branch channels can be omitted, and the first channel 51 can be divided (separated) into the first branch channels 55. Similarly, in the second channel plate 60, the second branch channels 73 can be omitted, and the second channel 71 can be divided (separated) into the second branch channels 75. The first channel 51 can be divided (separated) into three or more first branch channels. Similarly, the second channel 71 can be divided (separated) into three or more second branch channels.

The plates 10A, 10B, 20, 30, 40, 60, 80, 90A, 90B, and 90C only need to be made of a material to which a metal pipe can be welded and can be made, for example, of a metal other than stainless steel, such as copper, aluminum, or nickel-plated copper. When the plates 10A, 10B, 20, 30, 40, 60, 80, 90A, 90B, and 90C are made of copper, the thermal conductivity can be improved.

Figure 13:
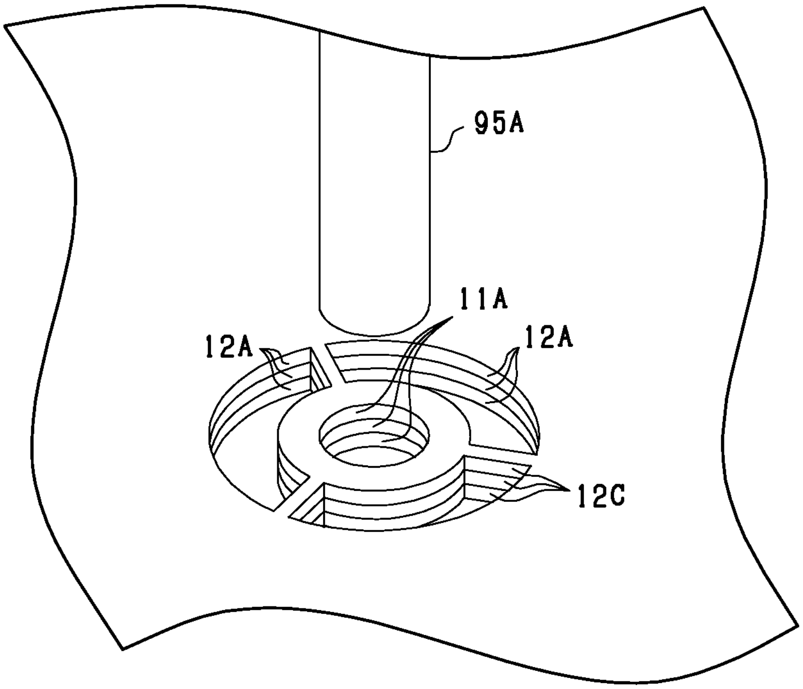
FIG. 13 is a perspective view showing an example of modification of the through-hole plates.

The thinner the wall thickness of the first inflow pipe 95A, the narrower the range over which heat is applied during the welding. In this case, it is necessary to precisely bring the position where heat is applied to a desired position, which increases the difficulty of the welding. In this regard, the micromixer 100 includes three through-hole plates, as shown in FIG. 13. The through hole 11A is formed in each of the through-hole plates. In each of the through-hole plates, three (a plurality of, or n) arcuate through grooves 12A (grooves) are formed around each of the through holes 11A. The central angle of the arc of each of the through grooves 12A is smaller than 120° (360°/n) by a predetermined angle. Bridges 12C (connecting portions), which are portions where no through groove 12A is formed, are formed between the through grooves 12A. After the welding, the three arcuate through grooves 12A are formed around the welded portion in each of the through-hole plates.

According to the configuration described above, when the first inflow pipe 95A, the second inflow pipe 95B, and the outflow pipe 98 are welded to the through-hole plates 10A and 10B, the grooves of the through-hole plates 10A and 10B can suppress diffusion of the heat to the portion around the position where the heat is applied. The welded portion W, where the first inflow pipe 95A, the second inflow pipe 95B, and the outflow pipe 98 are welded to the through-hole plates 10A and 10B, is therefore readily melted, whereby the difficulty of the welding can be lowered.

When a plurality of through grooves 12A are formed around the welded portion W in the plurality of through-hole plates 10A and 10B, the through grooves 12A disadvantageously cut the periphery of the welded portion W. In this regard, in the plurality of through-hole plates 10A and 10B, the plurality of through grooves 12A are formed around the welded portion W, and the bridges 12C, where no through groove 12A is formed, are provided between the plurality of through grooves 12A. According to the configuration described above, providing the bridges 12C, where no through groove is formed in the through-hole plates 10A and 10B, can prevent the through grooves 12A from cutting the entire periphery of the welded portion W.

The through holes and the through grooves are formed in accordance with the following procedure. That is, through holes 11A and through grooves 12A are simultaneously formed through etching in the through-hole plates 10A and 10B. The through holes 11A and the through grooves 12A can therefore be precisely aligned with each other, as compared with a case where the through holes 11A and the through grooves 12A are formed in separate steps. A thinner first inflow pipe 95A, second inflow pipe 95B, and outflow pipe 98 can therefore be employed. Furthermore, the through holes 11A and the through grooves 12A are simultaneously formed through etching in the through-hole plates 10A and 10B, and the bridges 12C are formed, as portions where no etching is performed on the through-hole plates 10A and 10B, simultaneously with the formation of the through grooves 12A. It is therefore not necessary to carry out the step of forming the bridges 12C separately from the step of forming the through holes 11A and the through grooves 12A.

Non-through grooves that do not pass through the through-hole plates 10A and 10B can instead be formed in place of the through grooves passing through the through-hole plates 10A and 10B.

When the first inflow pipe 95A is welded to the through-hole plates 10A and 10B, the heat diffusion is suppressed by the through grooves 12A, whereas the heat is readily diffused via the bridges 12C. Therefore, in the welded portion W, there is a risk that a difference in the degree of melting occurs between portions close to the through grooves 12A and portions close to the bridges 12C.

Figure 14:
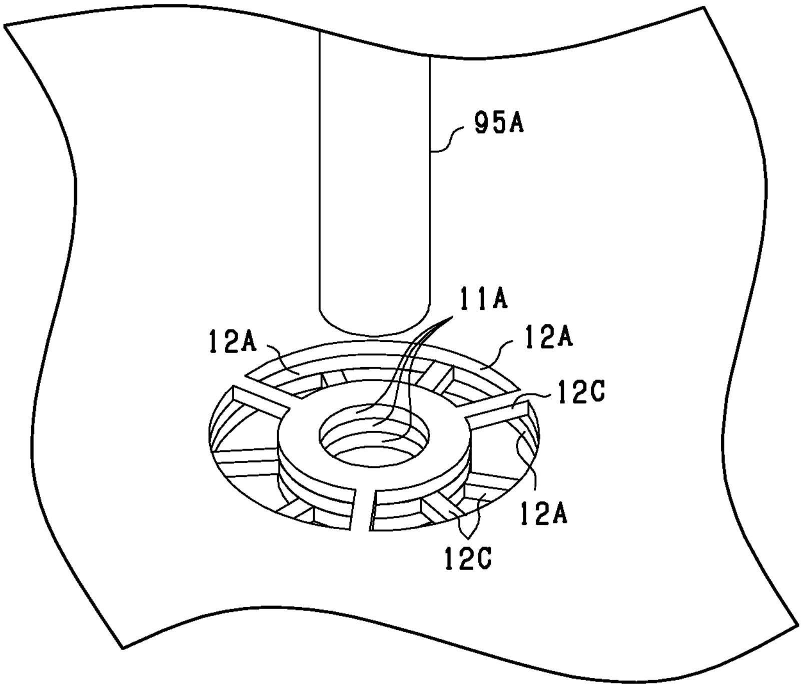
FIG. 14 is a perspective view showing another example of modification of the through-hole plates.

In the projection in the direction in which the through holes 11A extend, the positions of the bridges 12C of the plurality of through-hole plates 10A and 10B are shifted from each other, as shown in FIG. 14. The configuration described above allows the positions of the through grooves 12A and the positions of the bridges 12C to be dispersed in the circumferential direction of the through holes 11A. The configuration described above can therefore suppress a difference in the degree of melting of the welded portion W in the circumferential direction of the through holes 11A.

Figure 15:
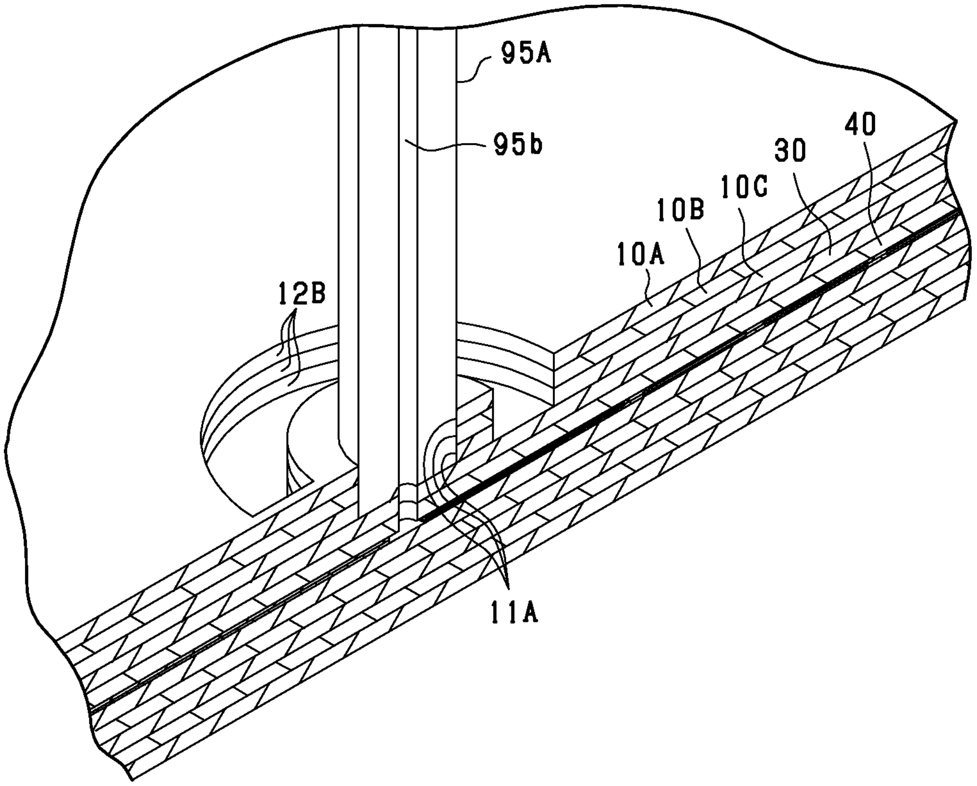
FIG. 15 is a perspective view showing another example of modification of the through-hole plates.

The micromixer 100 can include a through-hole plate 10C in place of the relay channel plate 20, as shown in FIG. 15. Furthermore, in the through-hole plates 10A to 10C, a roughly annular through groove 12B can be formed around the through holes 11A, that is, around the welded portion.

Figure 16:
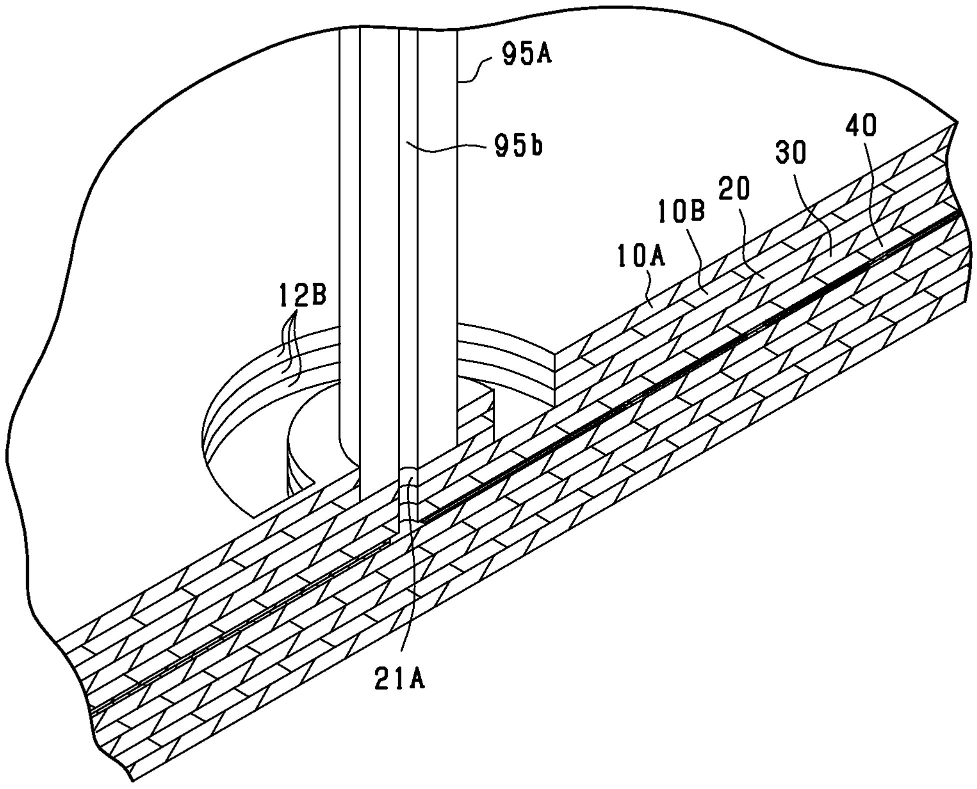
FIG. 16 is a cross-sectional perspective view showing an example of modification of the through-hole plates and a relay plate.

In the relay channel plate 20, the roughly annular through groove 12B can be formed around the through hole 21A, that is, around the portion facing the welded portion, as shown in FIG. 16. According to the configuration described above, when the first inflow pipe 95A is welded to the through-hole plate 10A, the through groove 12B in the relay channel plate 20 can suppress the diffusion of the heat to the portion around the position where the heat is applied. The welded portion where the first inflow pipe 95A is welded to the through-hole plate 10A is therefore readily melted, whereby the difficulty of the welding can be lowered.

Figure 17:
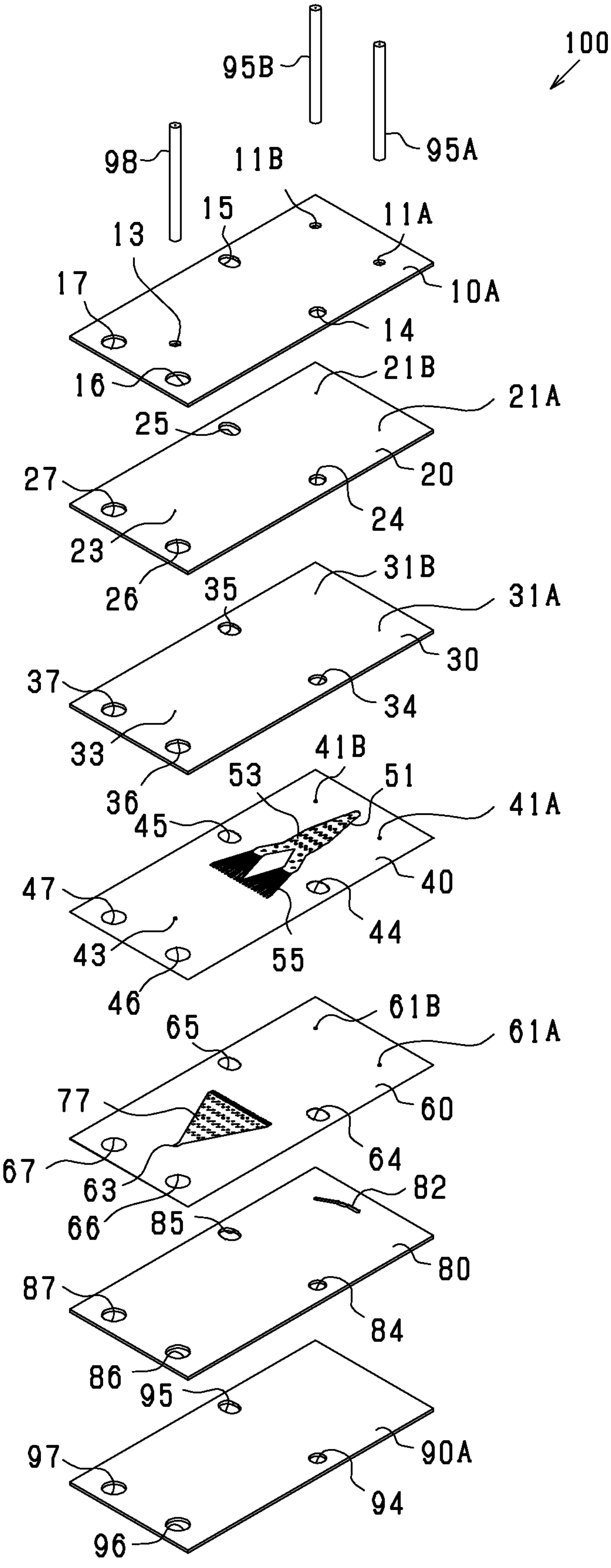
FIG. 17 is an exploded top perspective view of an example of modification of the micromixer.
Figure 18:
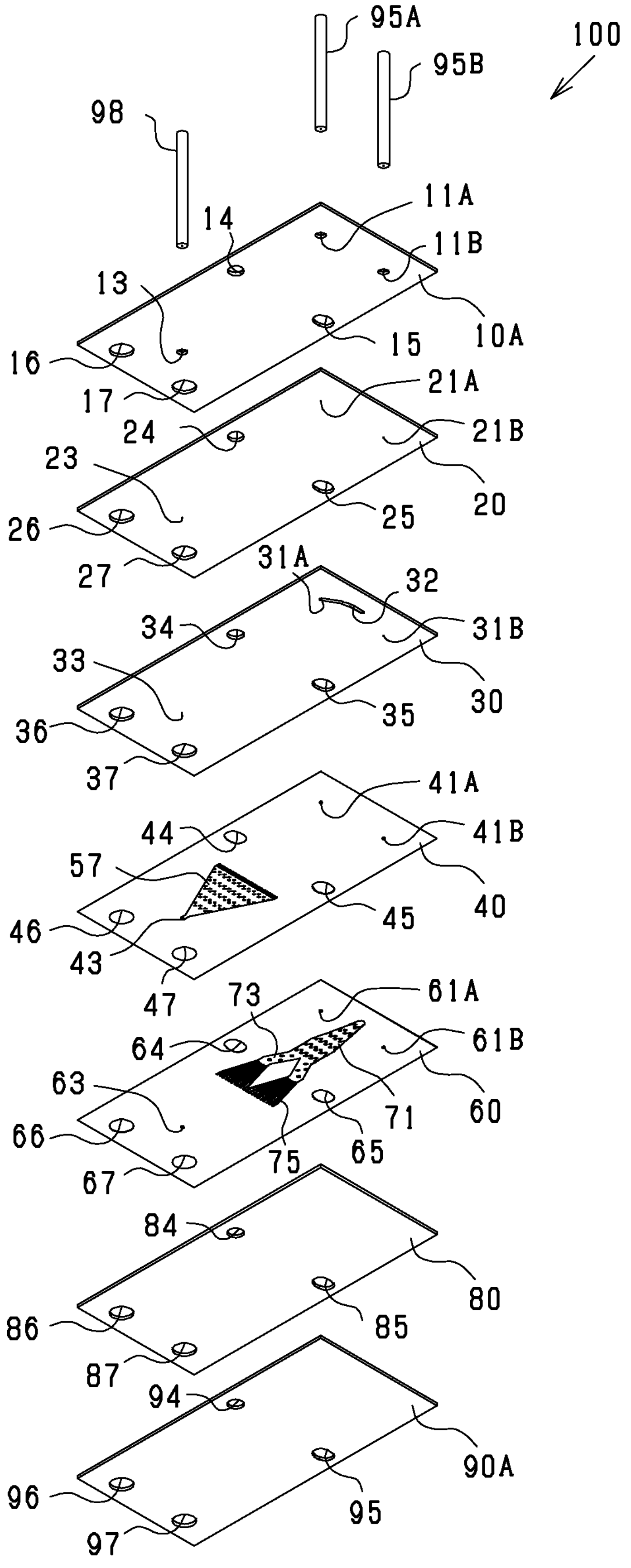
FIG. 18 is an exploded bottom perspective view of the example of modification of the micromixer.

In the micromixer 100 in FIG. 1, the through-hole plate 10B and the support plates 90B and 90C can be omitted, as shown in FIGS. 17 and 18. The configuration described above allows reduction in the number of plates required for the micromixer 100.

In the first channel plate 40, the first channel 51 and the first branch channels 53 and 55 can instead be formed in a step separate from the step in which the first confluence channel 57 is formed. Similarly, in the second channel plate 60, the second channel 71 and the second branch channels 73 and 75 can be formed in a step separate from the step in which the second confluence channel 77 is formed.

In each of the through-hole plates, the through hole 11A can be formed in a step different from the step in which the through grooves 12A and 12B are formed.

Figure 19:
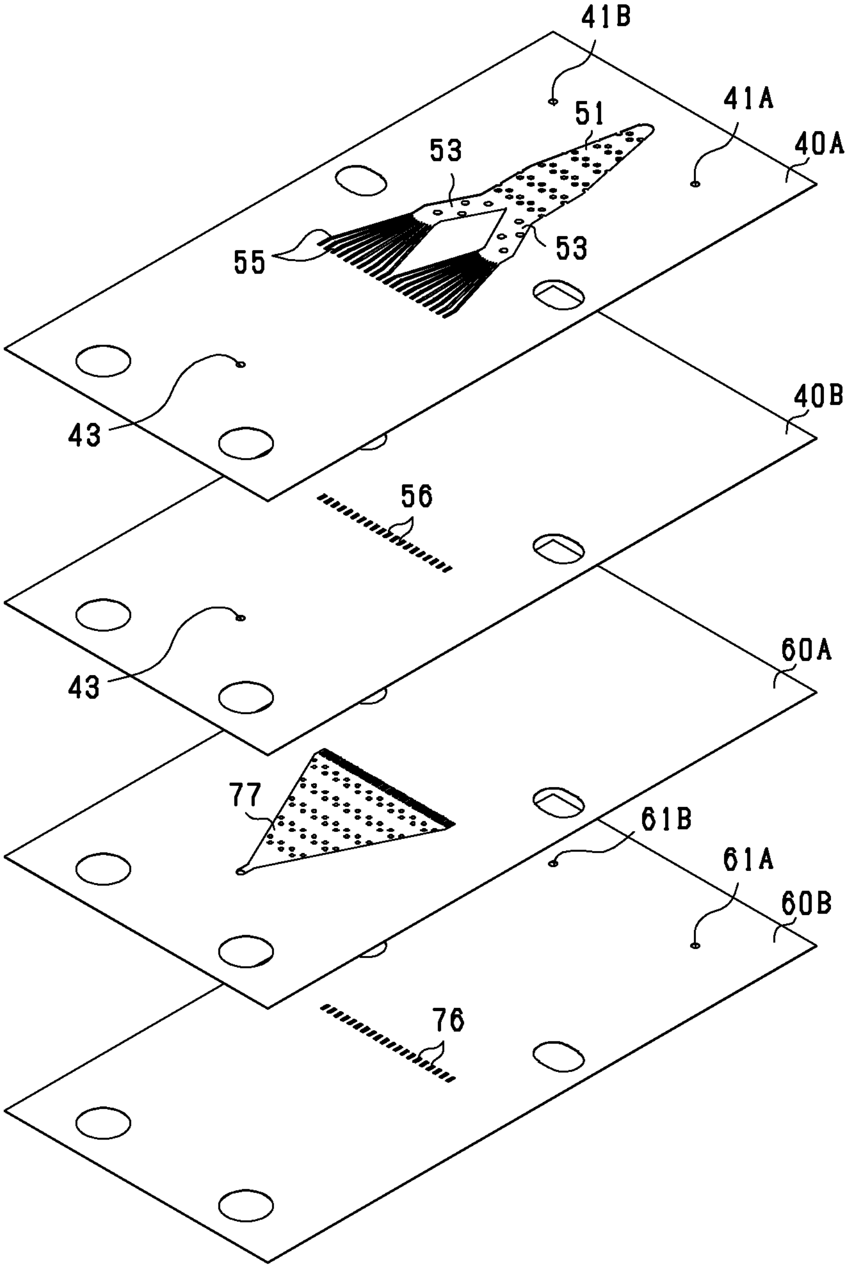
FIG. 19 is an exploded top perspective view of another example of modification of the micromixer.
Figure 20:
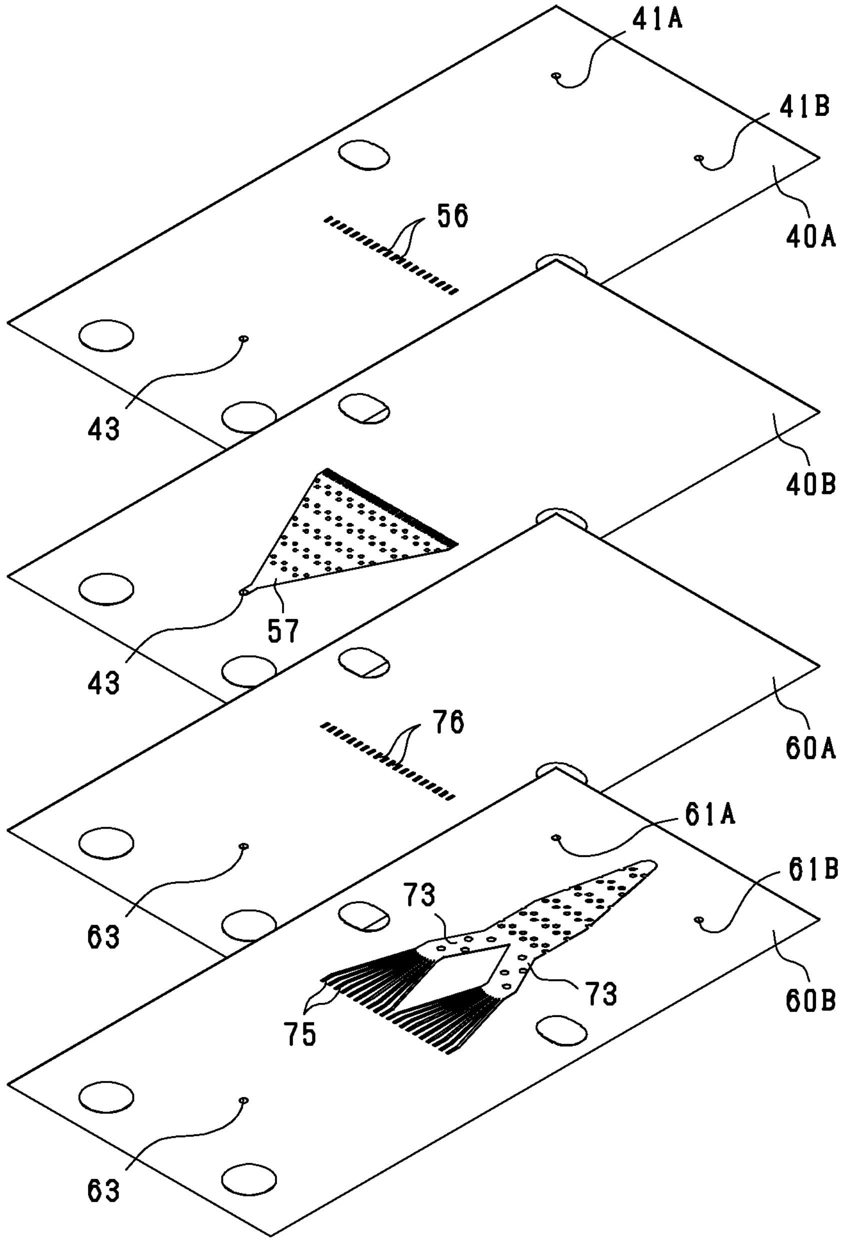
FIG. 20 is an exploded bottom perspective view of the other example of modification of the micromixer.

The aforementioned function of the first channel plate 40 can instead be achieved by a first channel plate 40A and a first channel plate 40B, as shown in FIGS. 19 and 20. Furthermore, the aforementioned function of the second channel plate 60 can instead be achieved by a second channel plate 60A and a second channel plate 60B.

That is, the first channel 51 and the first branch channels 53 and 55 are formed in the front surface of the first channel plate 40A, and the first confluence channel 57 is formed in the rear surface of the first channel plate 40B. The first communication channel 56 formed in the first channel plate 40A and the first communication channel 56 formed in the first channel plate 40B cause the first branch channels 55 to communicate with the first confluence channel 57. Similarly, the second confluence channel 77 is formed in the front surface of the second channel plate 60A, and the second channel 71 and the second branch channels 73 and 75 are formed in the rear surface of the second channel plate 60B. The second communication channel 76 formed in the second channel plate 60A and the second communication channel 76 formed in the second channel plate 60B cause the second branch channels 75 to communicate with the second confluence channel 77. The configuration described above can also provide the same effects and advantages as those provided by the embodiments described above.

In the projection in the direction perpendicular to the front surface of the micromixer 100, the configuration in which the first branch channels 55 and the second branch channels 75 are alternately disposed can be replaced with a configuration in which the first branch channels 55 and the second branch channels 75 are overlaid on each other. That is, the configuration in which the first branch channels 55 and the second branch channels 75 face each other allows the first fluid flowing from the first branch channels 55 into the first confluence channel 57 to collide with the second fluid flowing from the first branch channels 75 into the second confluence channel 77.

As the method of forming the through holes and the grooves in each of the plates, cutting or pressing can be employed in place of etching.

The outer shapes of the first inflow pipe 95A, the second inflow pipe 95B, and the outflow pipe 98, and the cross-sectional shapes of the channels are not limited to circular shapes, but can be arbitrarily changed. The second inflow pipe 95B can be provided at the rear surface (lower surface) of the micromixer 100. In this case, the non-through grooves 32 and 82 can be omitted, and the first inflow pipe 95A and the second inflow pipe 95B can be disposed so as to be overlaid on each other in the projection in the direction perpendicular to the front surface of the micromixer 100.

The outer shape of each of the plates is not limited to a rectangular shape and can be changed arbitrarily.

Instead of welding (fusion welding) the first inflow pipe 95A to the through-hole plate 10A, the first inflow pipe 95A can be brazed (brazing) to the through-hole plate 10A.

The fluids mixed with each other by the micromixer 100 is not limited to liquids and may be gases.

The structure in which the first inflow pipe 95A is welded or brazed to the through-hole plate 10A is not limited to the micromixer 100, and can be applied to other fluid control apparatuses.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10A: Through-hole plate, 10B: Through-hole plate, 10C: Through-hole plate, 11A: Through hole, 11B: Through hole, 12A: Through groove (groove), 12B: Through groove (groove), 12C: Bridge (connection portion), 13: Through hole, 20: Relay channel plate, 21A: Through hole (relay channel), 21B: Through hole (relay channel), 23: Through hole, 30: First inflow channel plate, 31A: Through hole, 31B: Through hole, 32: Non-through groove (channel), 33: Through hole, 40: First channel plate, 41A: Through hole, 41B: Through hole, 43: Through hole, 51: First channel, 53: First branch channel (first-stage channel), 55: First branch channel (second-stage channel), 56: First communication channel, 57: First confluence channel, 60: Second channel plate, 60A: Second channel plate, 60B: Second channel plate, 61A: Through hole, 61B: Through hole, 63: Through hole, 71: Second channel, 73: Second branch channel (first-stage channel), 75: Second branch channel (second-stage channel), 76: Second communication channel, 77: Second confluence channel, 80: Second inflow channel plate, 82: Non-through groove (channel), 90A: Support plate, 90B: Support plate, 90C: Support plate, 95A: First inflow pipe (pipe), 95B: Second inflow pipe (pipe), 98: Outflow pipe (pipe), 100: Micromixer

What is claimed is:

1. A micromixer comprising:

a first channel plate that:

has a front surface and a rear surface, wherein in the front surface, a first channel and a plurality of first branch channels are each formed by a non-through groove, and the first channel being divided into the first branch channels, and in the rear surface, a first confluence channel is formed by a non-through groove, and includes a first communication channel that communicates the first branch channels with the first confluence channel;

a first lid plate that covers the front surface of the first channel plate;

a second channel plate that:

has a front surface and a rear surface, wherein in the front surface, a second confluence channel is formed by a non-through groove, and in the rear surface, a second channel and a plurality of second branch channels are each formed by a non-through groove, the second channel being divided into the second branch channels, and includes a second communication channel that communicates the second branch channels with the second confluence channel, the second confluence channel facing and communicating with the first confluence channel; and a second lid plate that covers the rear surface of the second channel plate.

2. The micromixer according to claim 1, wherein the first branch channels include a plurality of first-stage channels and a plurality of second-stage channels, each of the first-stage channels being divided into the second-stage channels, the first communication channel communicates the second-stage channels in the first branch channels with the first confluence channel, the second branch channels include a plurality of first-stage channels and a plurality of second-stage channels, each of the first-stage channels being divided into the second-stage channels, and the second communication channel communicates the second-stage channels in the second branch channels with the second confluence channel.

3. The micromixer according to claim 2, wherein the first confluence channel includes a plurality of first confluence remainders where none of the non-through grooves are formed, the second confluence channel includes a plurality of second confluence remainders where none of the non-through grooves are formed, and the first confluence remainders and the second confluence remainders are bonded to each other.

4. The micromixer according to claim 3, wherein the first channel includes a plurality of first branch remainders where the non-through groove is not formed, the first branch remainders are bonded to the first lid plate, the second channel includes a plurality of second branch remainders where the non-through groove is not formed, and the second branch remainders are bonded to the second lid plate.

5. The micromixer according to claim 4, wherein the second channel plate is disposed such that the first branch remainders and the second branch remainders are overlaid on each other in a projection in a direction perpendicular to the front surface.

6. The micromixer according to claim 2, wherein the first channel includes a plurality of first branch remainders where the non-through groove is not formed, the first branch remainders are bonded to the first lid plate, the second channel includes a plurality of second branch remainders where the non-through groove is not formed, and the second branch remainders are bonded to the second lid plate.

7. The micromixer according to claim 6, wherein the second channel plate is disposed such that the first branch remainders and the second branch remainders are overlaid on each other in a projection in a direction perpendicular to the front surface.

8. The micromixer according to claim 1, wherein the first confluence channel includes a plurality of first confluence remainders where none of the non-through grooves are formed, the second confluence channel includes a plurality of second confluence remainders where none of the non-through grooves are formed, and the first confluence remainders and the second confluence remainders are bonded to each other.

9. The micromixer according to claim 8, wherein the first channel includes a plurality of first branch remainders where the non-through groove is not formed, the first branch remainders are bonded to the first lid plate, the second channel includes a plurality of second branch remainders where the non-through groove is not formed, and the second branch remainders are bonded to the second lid plate.

10. The micromixer according to claim 9, wherein the second channel plate is disposed such that the first branch remainders and the second branch remainders are overlaid on each other in a projection in a direction perpendicular to the front surface.

11. A method for manufacturing the micromixer according to claim 9, comprising:

a first step of:

simultaneously forming the first channel, the first branch channels, and the first confluence channel in the first channel plate through etching, forming the first confluence remainders where the etching is not performed in the first confluence channel simultaneously with the formation of the first confluence channel, and forming the first branch remainders where the etching is not performed in the first channel simultaneously with the formation of the first channel; and a second step of:

simultaneously forming the second channel, the second branch channels, and the second confluence channel in the second channel plate through etching, forming the second confluence remainders where the etching is not performed in the second confluence channel simultaneously with the formation of the second confluence channel, and forming the second branch remainders where the etching is not performed in the second channel simultaneously with the formation of the second channel.

12. The micromixer according to claim 1, wherein the first channel includes a plurality of first branch remainders where the non-through groove is not formed, the first branch remainders are bonded to the first lid plate, the second channel includes a plurality of second branch remainders where the non-through groove is not formed, and the second branch remainders are bonded to the second lid plate.

13. The micromixer according to claim 12, wherein the second channel plate is disposed such that the first branch remainders and the second branch remainders are overlaid on each other in a projection in a direction perpendicular to the front surface.

14. The micromixer according to claim 1, wherein the first channel plate includes:

first branch grooves that are formed at an outer edge of the first channel plate and have a depth equal to a depth of the first channel or a depth of the first branch channels; and first confluence grooves that are formed at the outer edge and have a depth equal to a depth of the first confluence channel but different from the depth of the first branch grooves.

15. The micromixer according to claim 14, wherein the second channel plate includes:

second confluence grooves that are formed at an outer edge of the second channel plate and have a depth equal to a depth of the second confluence channel; and second branch grooves that are formed at the outer edge and have a depth equal to a depth of the second channel or a depth of the second branch channels but different from the depth of the second confluence grooves, the first lid plate includes a first lid through hole or a first lid channel, the first lid plate includes a first lid groove that is formed at an outer edge of the first lid plate and has a depth equal to a depth of the first lid through hole or a depth of the first lid channel, the second lid plate includes a second lid through hole or a second lid channel, the second lid plate includes a second lid groove that is formed at an outer edge of the second lid plate and has a depth equal to a depth of the second lid through hole or a depth of the second lid channel, and in a projection in a direction perpendicular to the front surface, a position of the first lid groove, positions of the first branch grooves, positions of the first confluence grooves, positions of the second confluence grooves, positions of the second branch grooves, and a position of the second lid groove are shifted from one another.

16. The micromixer according to claim 1, wherein the second channel plate includes:

second confluence grooves that are formed at an outer edge of the second channel plate and have a depth equal to a depth of the second confluence channel; and second branch grooves that are formed at the outer edge and have a depth equal to a depth of the second channel or a depth of the second branch channels but different from the depth of the second confluence grooves.

17. The micromixer according to claim 1, wherein the first branch channels and the second branch channels are alternately disposed in a projection in a direction perpendicular to the front surface.

18. A method for manufacturing the micromixer according to claim 1, the method comprising:

a first step of simultaneously forming the first channel, the first branch channels, and the first confluence channel in the first channel plate through etching; and a second step of simultaneously forming the second channel, the second branch channels, and the second confluence channel in the second channel plate through etching.

* * * * *